(12) United States Patent
Inoue

(10) Patent No.: US 11,799,653 B2
(45) Date of Patent: Oct. 24, 2023

(54) COMPUTER-READABLE RECORDING MEDIUM, MANAGEMENT APPARATUS, AND METHOD FOR IDENTITY VERIFICATION

(71) Applicant: FUJITSU LIMITED, Kawasaki (JP)

(72) Inventor: Koki Inoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 17/020,906

(22) Filed: Sep. 15, 2020

(65) Prior Publication Data

US 2021/0111891 A1 Apr. 15, 2021

(30) Foreign Application Priority Data

Oct. 9, 2019 (JP) ................................. 2019-186043

(51) Int. Cl.
*H04L 9/32* (2006.01)
*G06F 21/62* (2013.01)

(52) U.S. Cl.
CPC .......... *H04L 9/321* (2013.01); *G06F 21/6245* (2013.01); *G06F 21/6272* (2013.01); *H04L 9/3263* (2013.01)

(58) Field of Classification Search
CPC ... H04L 9/321; H04L 9/3263; G06F 21/6245; G06F 21/6272
See application file for complete search history.

(56) References Cited

U.S. PATENT DOCUMENTS

| | | | | |
|---|---|---|---|---|
| 7,290,133 B1 * | 10/2007 | Montgomery | ........ | H04L 9/3263 713/156 |
| 7,415,607 B2 * | 8/2008 | Sinn | ........................ | G06F 21/33 707/E17.005 |
| 7,953,979 B2 * | 5/2011 | Borneman | .............. | G06F 21/41 713/175 |

(Continued)

FOREIGN PATENT DOCUMENTS

| JP | 2002-269295 A | 9/2002 |
|---|---|---|
| JP | 2008-234451 A | 10/2008 |

(Continued)

OTHER PUBLICATIONS

Bhargav-Spantzel et al., "Trust Negotiation in Identity Management", 2007, IEEE Computer Society, pp. 55-63 (Year: 2007).*

(Continued)

*Primary Examiner* — John B King
*Assistant Examiner* — Alex D Carrasquillo
(74) *Attorney, Agent, or Firm* — Fujitsu Patent Center

(57) ABSTRACT

An identity verification is managed by generating a workflow used by a control apparatus that controls a system in which a plurality of business entities manages attribute information in user information that identifies a user. The workflow is generated, based on a first list of target business entities that perform identity verification of the user, a second list of business entities indicating whether cooperation is performed among the business entities for the identity verification, a number of electronic certificates that certify the user information for completing the identity verification, and a procedure time taken by each of the business entities for the identity verification, so that the workflow minimizes a procedure time taken for completion of the identity verification by the target business entities, and that describes a distribution procedure of the electronic certificates that are used in the identity verification at each of the business entities.

8 Claims, 21 Drawing Sheets

(56) References Cited

U.S. PATENT DOCUMENTS

| | | | | |
|---|---|---|---|---|
| 8,015,600 | B2* | 9/2011 | Sinn | H04L 63/0823 726/10 |
| 8,375,213 | B2* | 2/2013 | Borneman | H04L 69/329 713/176 |
| 8,719,576 | B2* | 5/2014 | Buldas | G06F 21/645 713/175 |
| 9,754,253 | B1* | 9/2017 | Brandwine | G06Q 20/382 |
| 10,742,426 | B2* | 8/2020 | Barry | H04L 9/321 |
| 10,810,515 | B2* | 10/2020 | Hinton | G06Q 10/00 |
| 2002/0138543 | A1* | 9/2002 | Teng | G06Q 10/06 707/E17.005 |
| 2006/0117179 | A1* | 6/2006 | Karabulut | H04L 9/3265 713/175 |
| 2009/0265753 | A1* | 10/2009 | Anderson | H04L 63/104 726/1 |
| 2013/0110919 | A1 | 5/2013 | An et al. | |
| 2015/0058931 | A1* | 2/2015 | Miu | G06Q 20/02 707/784 |
| 2015/0106882 | A1* | 4/2015 | Li | G06F 21/335 726/4 |
| 2015/0170085 | A1* | 6/2015 | Amtrup | G06Q 10/06316 705/7.26 |
| 2019/0163889 | A1* | 5/2019 | Bouse | G06F 21/6218 |

FOREIGN PATENT DOCUMENTS

| | | | |
|---|---|---|---|
| JP | 2010-113462 A | 5/2010 | |
| JP | 2016-148919 A | 8/2016 | |
| JP | 2019-40537 A | 3/2019 | |
| WO | WO-0118717 A1 * | 3/2001 | G06F 21/305 |

OTHER PUBLICATIONS

Bardini et al., "Automated issuance of digital certificates through the use of federations", 2016, IEEE 11th International Conference on Availability, Reliability and Security, pp. 725-732 (Year: 2016).*

Niemiec et al. "Federated Identity in Real-life Applications", European Conference on Networks and Communications, IEEE, 2015 (Year: 2015).*

EESR—Extended European Search Report of European Patent Application No. 20194586.2 dated Oct. 30, 2020.

EPOA—Office Action of European Patent Application No. 20194586.2 dated Aug. 13, 2021.

EPOA—European Patent Office Action [Summons to attend oral proceedings pursuant to Rule 115(1) EPC] dated Aug. 8, 2022 for corresponding European Patent Application No. 20194586.2.

* cited by examiner

FIG. 4A

| USER ID | USER NAME | ATTRIBUTE NAME 1 (ADDRESS) | ATTRIBUTE NAME 2 (DATE OF BIRTH) | ATTRIBUTE NAME 3 (MY NUMBER) | ... | ATTRIBUTE NAME N |
|---|---|---|---|---|---|---|
| 0000001 | JOHN SMITH | XXX LOS ANGELES | 8/10/1980 | 123456 | ... | ... |
| 0000002 | TOM SMITH | XXX SAN FRANCISCO | 9/10/1985 | 654321 | ... | ... |
| ... | ... | ... | ... | ... | ... | ... |

| USER ID | USER NAME | ATTRIBUTE NAME 1 (ADDRESS) | ATTRIBUTE NAME 2 (WORKPLACE) | ATTRIBUTE NAME 3 (ANNUAL INCOME) | ... | ATTRIBUTE NAME N |
|---|---|---|---|---|---|---|
| 0000001 | MARK SMITH | XXX LOS ANGELES | CCC FOOD | 5,000,000 | ... | ... |
| 0000002 | TOM SMITH | XXX SAN FRANCISCO | BBB KOSAN INC. | 9,000,000 | ... | ... |
| 0000003 | JOHN SMITH | XXX LOS ANGELES | AAA CORPORATION | 10,000,000 | ... | ... |
| ... | ... | ... | ... | ... | ... | ... |

24A

```
USER → BUSINESS ENTITY A
USER → BUSINESS ENTITY B
BUSINESS ENTITY A → BUSINESS ENTITY C
BUSINESS ENTITY A → BUSINESS ENTITY D
BUSINESS ENTITY B → BUSINESS ENTITY C
BUSINESS ENTITY C → BUSINESS ENTITY D
```

FIG. 10

| TERMINAL ID | ADDRESS |
|---|---|
| ID OF SWITCHING UNIT | adr0 |
| ID OF CONTROL UNIT | adr1 |
| ID OF BUSINESS ENTITY TERMINAL APPARATUS OF BUSINESS ENTITY A | adr2 |
| ID OF BUSINESS ENTITY TERMINAL APPARATUS OF BUSINESS ENTITY B | adr3 |
| ID OF BUSINESS ENTITY TERMINAL APPARATUS OF BUSINESS ENTITY C | adr4 |
| ID OF BUSINESS ENTITY TERMINAL APPARATUS OF BUSINESS ENTITY D | adr5 |
| ... | ... |

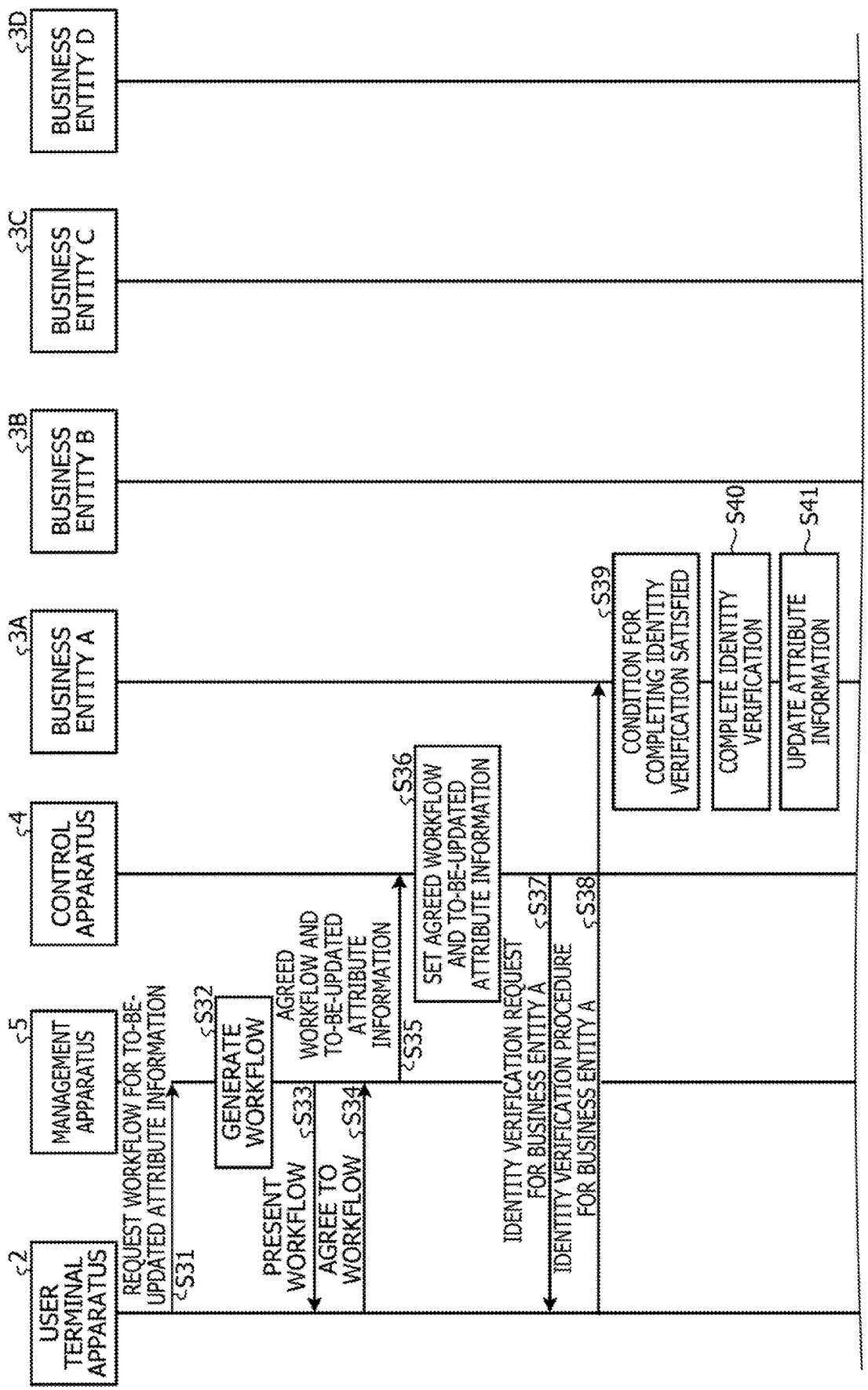

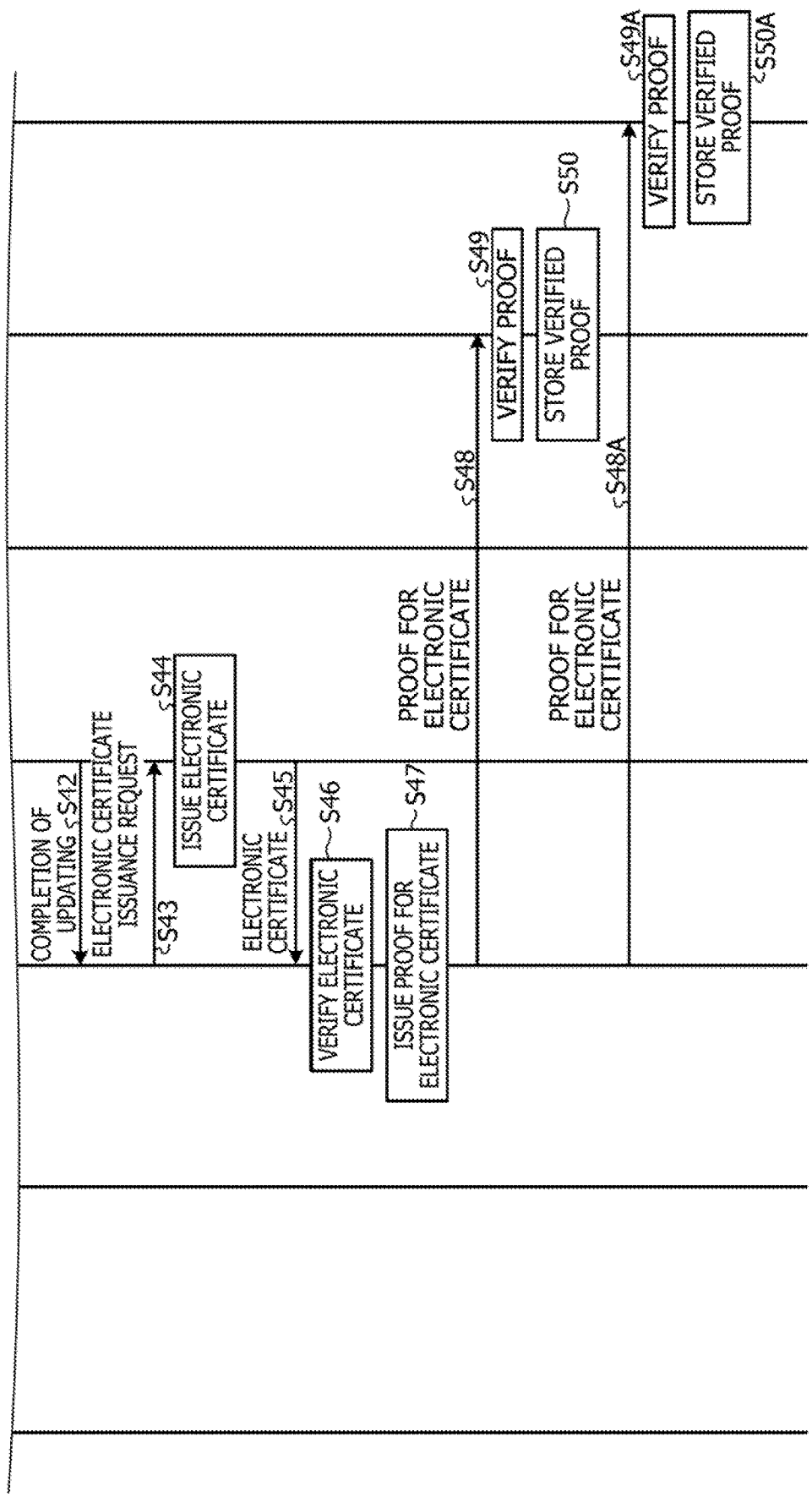

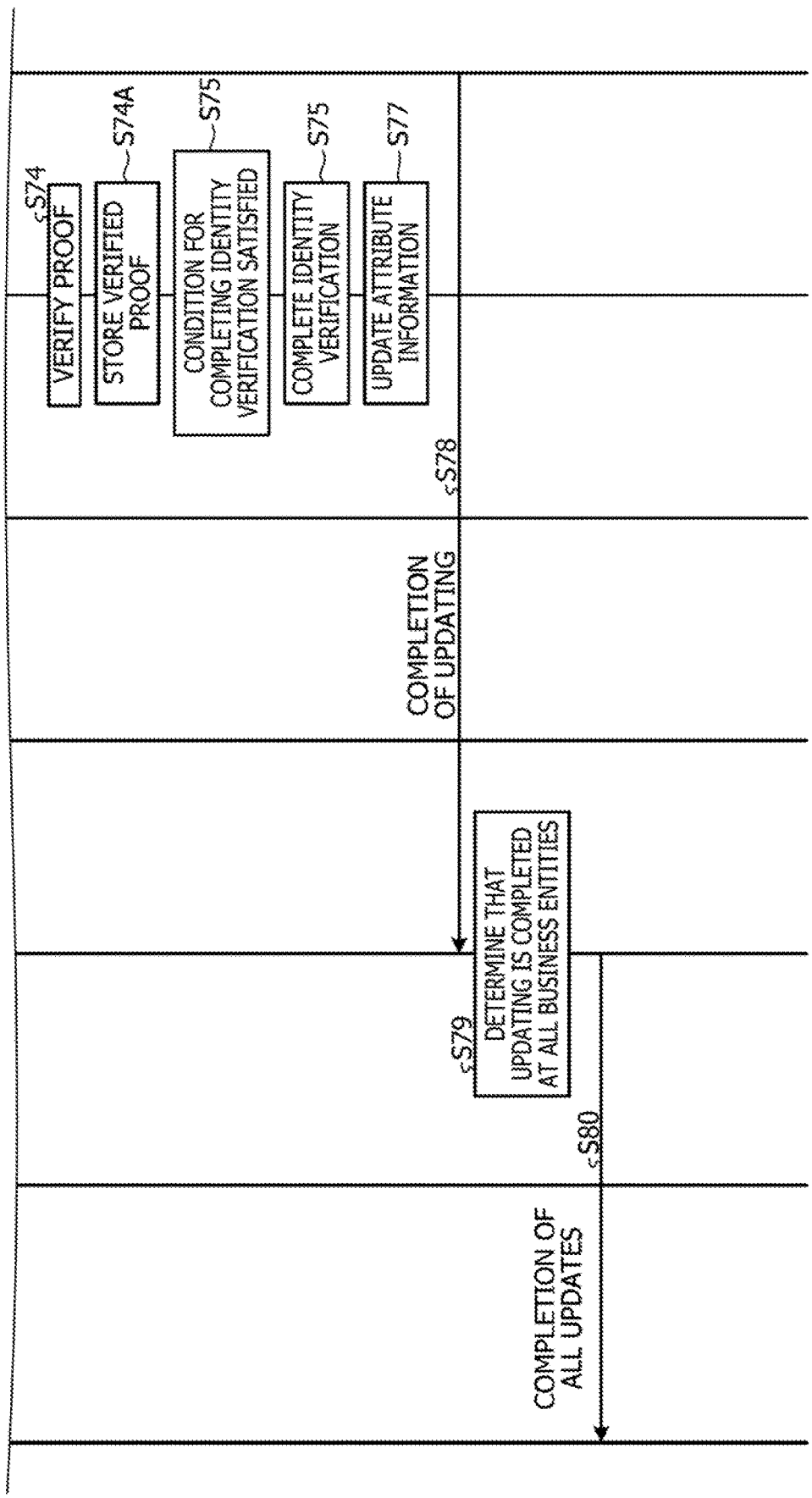

```
USER → BUSINESS ENTITY A, BUSINESS ENTITY B
BUSINESS ENTITY A → BUSINESS ENTITY C, BUSINESS ENTITY D
BUSINESS ENTITY B → BUSINESS ENTITY C
BUSINESS ENTITY C → BUSINESS ENTITY D
```

COMPUTER-READABLE RECORDING MEDIUM, MANAGEMENT APPARATUS, AND METHOD FOR IDENTITY VERIFICATION

CROSS-REFERENCE TO RELATED APPLICATION

This application is based upon and claims the benefit of priority of the prior Japanese Patent Application No. 2019-186043, filed on Oct. 9, 2019, the entire contents of which are incorporated herein by reference.

FIELD

The embodiments discussed herein are related to a computer-readable recording medium, a management apparatus, and a method for identity verification.

BACKGROUND

In recent years, attention has been paid to a system in which a plurality of business entities manages, in a distributed manner, identity information (ID information) which is digitized user information of users. The ID information includes attribute information such as an address, a telephone number, and a name of a user, for example, and is information from which the user is identifiable.

The related art is described in Japanese Laid-open Patent Publication No. 2008-234451, Japanese Laid-open Patent Publication No. 2010-113462, Japanese Laid-open Patent Publication No. 2019-40537, Japanese Laid-open Patent Publication No. 2002-269295, and Japanese Laid-open Patent Publication No. 2016-148919.

In the aforementioned system, for example, when attribute information such as an address of a user is added, deleted, changed, or the like, the attribute information at all the business entities that manage this attribute information is to be updated. Therefore, the user submits or sends a certificate such as a confirmation document for changing the attribute information directly to each of the business entities to perform an identity verification procedure. Each business entity updates the attribute information of the user after identity verification of the user is completed, for example, after identity of the user is confirmed.

SUMMARY

According to an aspect of the embodiments, a method for identity verification to be executed in a computer configured to generate a workflow used by a control apparatus that controls a system in which a plurality of business entities manage, in a distributed manner, attribute information in user information that identifies a user, the method includes: receiving, as inputs, a first list of target business entities that perform identity verification of the user, a second list of business entities indicating whether cooperation is performed among a plurality of business entities for the identity verification of the user, a number of electronic certificates that certify the user information and are used by each of the business entities to complete the identity verification, and a procedure time taken by each of the business entities for the identity verification; and generating, based on the first list, the second list, the number of electronic certificates for each of the business entities, and the procedure time, a workflow that minimizes a procedure time taken for completion of the identity verification by the target business entities and that describes a distribution procedure of the electronic certificates that are used in the identity verification at each of the business entities.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is an explanatory diagram illustrating an example of an attribute information storage unit of the business entity terminal apparatus of a business entity A;

FIG. 4B is an explanatory diagram illustrating an example of the attribute information storage unit of the business entity terminal apparatus of a business entity B;

FIG. 10 is an explanatory diagram illustrating an example of a routing table stored in the control apparatus;

FIGS. 13A and 13B are divided parts of a sequence diagram illustrating an example of an attribute information updating operation performed by the ID distribution system;

FIGS. 14A to 14C are divided parts of a sequence diagram illustrating the example of the attribute information updating operation performed by the ID distribution system;

DESCRIPTION OF EMBODIMENTS

In the conventional art, the user has to perform the identity verification procedure for each business entity, and the burden for the identity verification is large.

In one aspect, it is an object to provide a computer-readable recording medium having stored therein an identity verification program and so on which may reduce a burden for identity verification of a user at a plurality of business entities.

According to one aspect, a burden for identity verification of a user at a plurality of business entities may be reduced.

Embodiments of an identity verification program and the like disclosed in the present application will be described in detail below with reference to the drawings. The embodiments are not intended to limit the disclosed technology. The embodiments below may be combined appropriately within a range not causing any contradiction.

EMBODIMENTS

Figure 1:
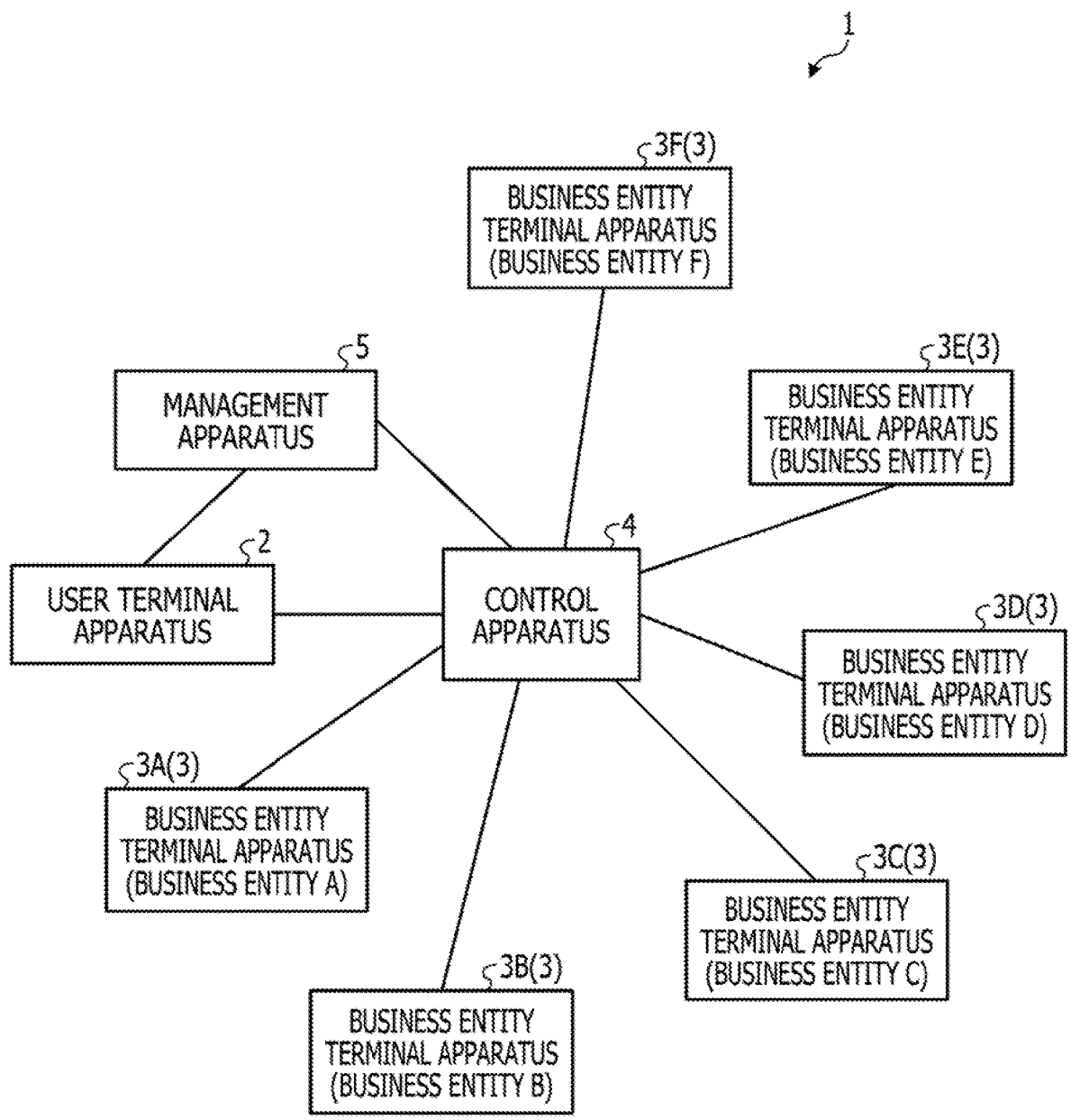
FIG. 1 is an explanatory diagram illustrating an example of an ID distribution system according to an embodiment.

FIG. 1 is an explanatory diagram illustrating an example of an ID distribution system 1 according to the present embodiment. The ID distribution system 1 illustrated in FIG. 1 includes a user terminal apparatus 2, a plurality of business entity terminal apparatuses 3, a control apparatus 4, and a management apparatus 5. The user terminal apparatus 2 is, for example, an information processing apparatus, such as a personal computer, a tablet terminal, or a smartphone, used by a user. Each of the business entity terminal apparatuses 3 is, for example, an information processing apparatus, such as a personal computer, a tablet terminal, or a server apparatus, deployed for each business entity. The business entity terminal apparatuses 3 include, for example, a business entity terminal apparatus 3A deployed for a business entity A, a business entity terminal apparatus 3B deployed for a business entity B, a business entity terminal apparatus 3C deployed for a business entity C, and a business entity terminal apparatus 3D deployed for a business entity D. The business entity terminal apparatuses 3 also include a business entity terminal apparatus 3E deployed for a business entity E and a business entity terminal apparatus 3F deployed for a business entity F. The control apparatus 4 is, for example, an information processing apparatus such as a server apparatus that manages the entire ID distribution system 1. The management apparatus 5 is, for example, an information processing apparatus such as a server apparatus that generates a workflow (to be described later) used by the control apparatus 4. The control apparatus 4 couples each of the business entity terminal apparatuses 3 to a communication network (not illustrated) such as the Internet or a local area network (LAN), for example. For convenience of explanation, one user terminal apparatus 2, six business entity terminal apparatuses 3, one control apparatus 4, and one management apparatus 5 are illustrated in the ID distribution system 1, but the numbers of apparatuses are not limited these and may be changed appropriately.

The individual business entity terminal apparatuses 3 manage user ID information for identifying a user in a distributed manner. The user ID information is user information including attribute information such as the name, the address, and the telephone number of the user. When the user changes their attribute information, the user requests the management apparatus 5 to generate a workflow that minimizes the procedure time of identity verification for the to-be-updated attribute information. In response to the request from the user, the management apparatus 5 generates a workflow that includes a distribution procedure of electronic certificates and that minimizes the procedure time for identity verification of the user performed when the attribute information is updated, and presents the workflow to the user terminal apparatus 2. The management apparatus 5 sets the workflow in the control apparatus 4 when agreement to the presented workflow is obtained from the user. Based on the set workflow, the control apparatus 4 causes each business entity to perform identity verification and updating of the attribute information.

For example, there are a case where the business entity updates the attribute information when identity verification in which the user involves (hereinafter, user-based identity verification) is completed and a case where the business entity updates the attribute information when identity verification using electronic certificates (hereinafter, referred to as electronic-certificate-based identity verification) is completed.

The user-based identity verification refers to an identity verification procedure in which the user visits a window at the business entity and presents a confirmation document such as a driver's license, a resident card, a health insurance card, or a student identification card, for example. The user-based identity verification also refers to an identity verification procedure in which the user sends a copy of a confirmation document, a photograph, or an image to a business entity by mail, by email, via a web application, or the like, for example.

In the electronic-certificate-based identity verification, a certain business entity issues an electronic certificate of user information confirmed through the user-based identity verification procedure and transmits the electronic certificate to other business entities under the agreement of the user. The other business entities verify the received electronic certificate to confirm the authenticity of the electronic certificate issuer. The other business entities complete the identity verification procedure for the user in response to verification of the electronic certificate.

Figure 2:
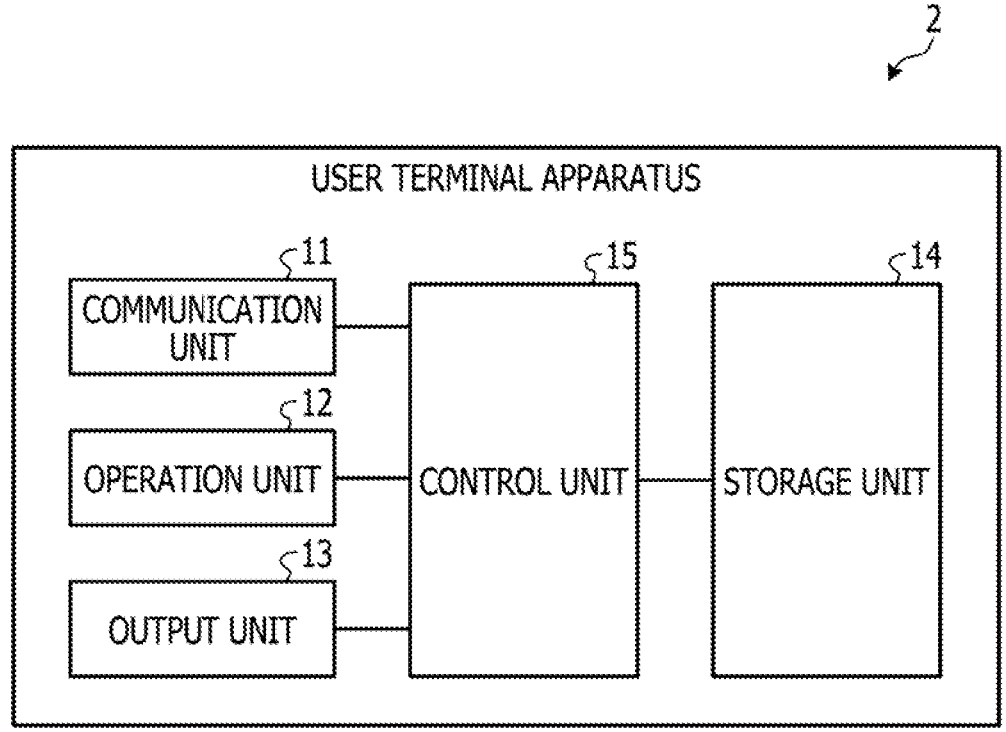
FIG. 2 is an explanatory diagram illustrating an example of a user terminal apparatus.

FIG. 2 is an explanatory diagram illustrating an example of the user terminal apparatus 2. The user terminal apparatus 2 illustrated in FIG. 2 includes a communication unit 11, an operation unit 12, an output unit 13, a storage unit 14, and a control unit 15. The communication unit 11 is, for example, a communication interface (IF) that couples the user terminal apparatus 2 to the management apparatus 5 and the control apparatus 4 by communication. The operation unit 12 is an input IF that receives various commands as inputs. The output unit 13 is an output IF that outputs various kinds of information by sound or display. The storage unit 14 is a storage area that stores various kinds of information. The control unit 15 controls the entire user terminal apparatus 2.

Figure 3:
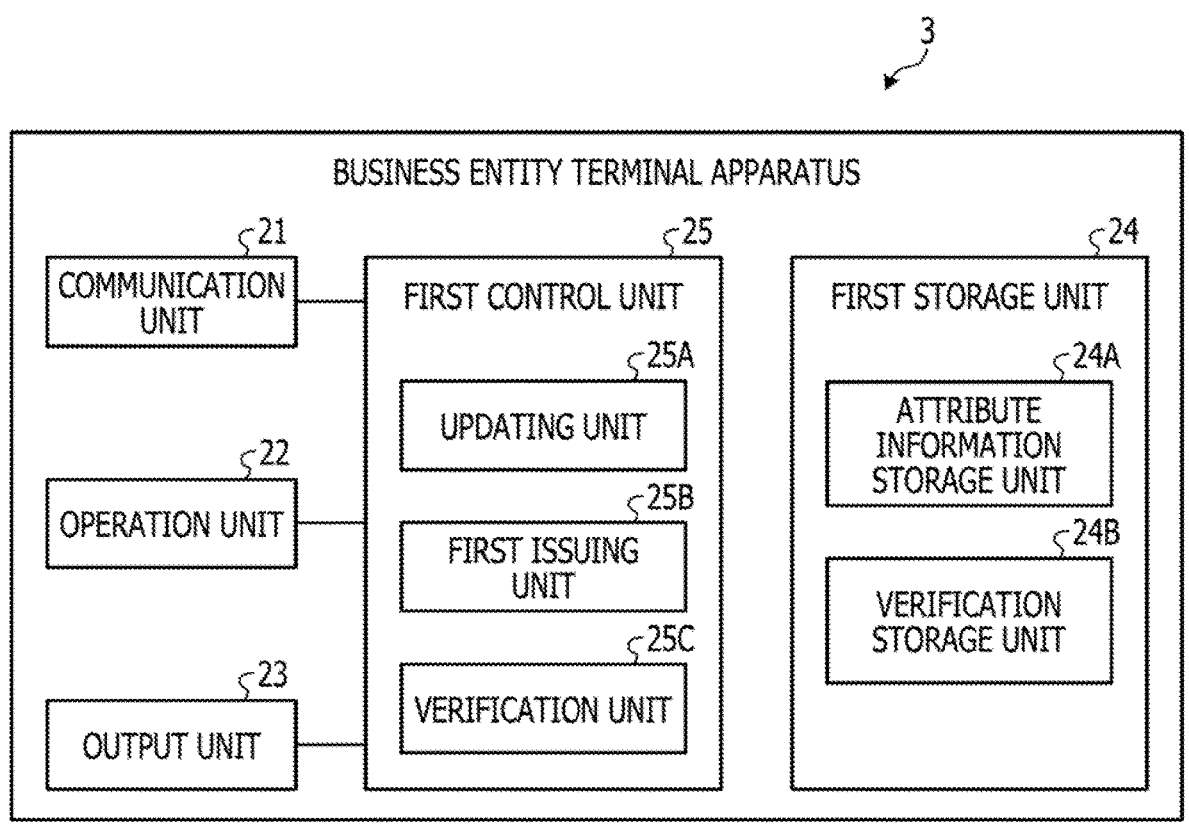
FIG. 3 is an explanatory diagram illustrating an example of a business entity terminal apparatus.

FIG. 3 is an explanatory diagram illustrating an example of the business entity terminal apparatus 3. The business entity terminal apparatus 3 illustrated in FIG. 3 includes a communication unit 21, an operation unit 22, an output unit 23, a first storage unit 24, and a first control unit 25. The communication unit 21 is, for example, a communication IF that couples the business entity terminal apparatus 3 to the control apparatus 4 by communication. The operation unit 22 is an input IF that receives various commands as inputs. The output unit 23 is an output IF that outputs various kinds of information by sound or display. The first storage unit 24 is a storage area that stores various kinds of information. The first control unit 25 controls the entire business entity terminal apparatus 3.

The first storage unit 24 includes an attribute information storage unit 24A and a verification storage unit 246. The attribute information storage unit 24A is an area in which the business entity terminal apparatus 3 manages attribute information of each user. The attribute information is part of the user ID information, and includes various kinds of information such as the address, the telephone number, and the date of birth of the user, for example. The verification storage unit 246 is an area that stores verified proofs (described later).

The first control unit 25 includes an updating unit 25A, a first issuing unit 25B, and a verification unit 25C. The updating unit 25A updates contents of the attribute information of each user stored in the attribute information storage unit 24A. The first issuing unit 25B issues an electronic certificate of the user ID information when the contents of the attribute information are updated. The verification unit 25C verifies a proof for the electronic certificate of user ID information, received from the control apparatus 4 (described later). When the authenticity of the electronic certificate issuer is confirmed based on the verification result, the verification unit 25C stores the successfully verified proof in the verification storage unit 24B.

FIG. 4A is an explanatory diagram illustrating an example of the attribute information storage unit 24A of the business entity terminal apparatus 3A of the business entity A. The attribute information storage unit 24A illustrated in FIG. 4A is, for example, the attribute information storage unit 24A of the business entity terminal apparatus 3A of the business entity A. The attribute information storage unit 24A manages a user ID, a user name, an attribute name 1, an attribute name 2, an attribute name 3, . . . , and an attribute name N in association with one another. The user ID is the identifier for identifying a user. The user name is the name of the user for identifying the user. The attribute name 1 is, for example, the address of the user. The attribute name 2 is, for example, the date of birth of the user. The attribute name 3 is, for example, the My Number (corresponding to the Social Security number in the United States) of the user.

FIG. 48 is an explanatory diagram illustrating an example of the attribute information storage unit 24A of the business entity terminal apparatus 3B of the business entity B. The attribute information storage unit 24A illustrated in FIG. 4B is, for example, the attribute information storage unit 24A of the business entity terminal apparatus 3B of the business entity B. The attribute information storage unit 24A manages a user ID, a user name, an attribute name 1, an attribute name 2, an attribute name 3, . . . , and an attribute name N in association with one another. The attribute name 1 is, for example, the address of the user. The attribute name 2 is, for example, the workplace of the user. The attribute name 3 is, for example, the annual income of the user.

Figure 5:
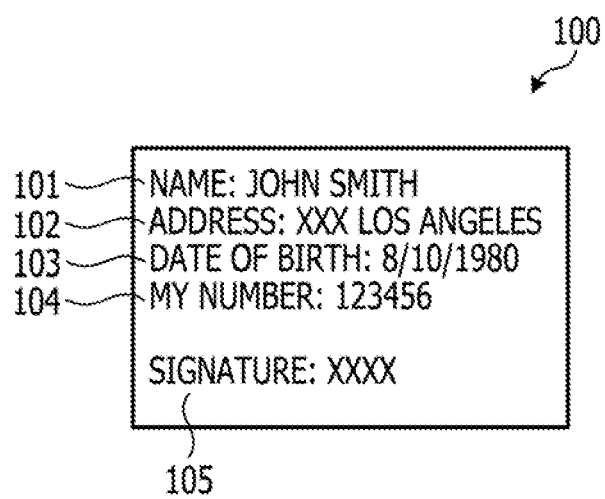
FIG. 5 is an explanatory diagram illustrating an example of an electronic certificate issued by the business entity terminal apparatus of the business entity A.

FIG. 5 is an explanatory diagram illustrating an example of an electronic certificate issued by the business entity terminal apparatus 3A of the business entity A. An electronic certificate 100 illustrated in FIG. 5 is an electronic certificate issued for user ID information by the first issuing unit 25B of the business entity terminal apparatus 3A. The electronic certificate 100 includes the contents of the attribute information illustrated in FIG. 4A, for example, a name 101, an address 102, a date of birth 103, a My Number 104, and a signature 105. The electronic certificate 100 is an electronic certificate with which the business entity A that is an issuer certifies the authenticity of the user ID information of the user. The name 101 is the name for identifying the user. The address 102 is the address of the user. The date of birth 103 is the date of birth of the user. The My Number 104 is the My Number of the user. The signature 105 is the signature of the business entity A that is the issuer. The electronic certificate 100 is encrypted using the private key of the business entity A that is the issuer, based on the mechanism of the electronic signature.

Figure 6:
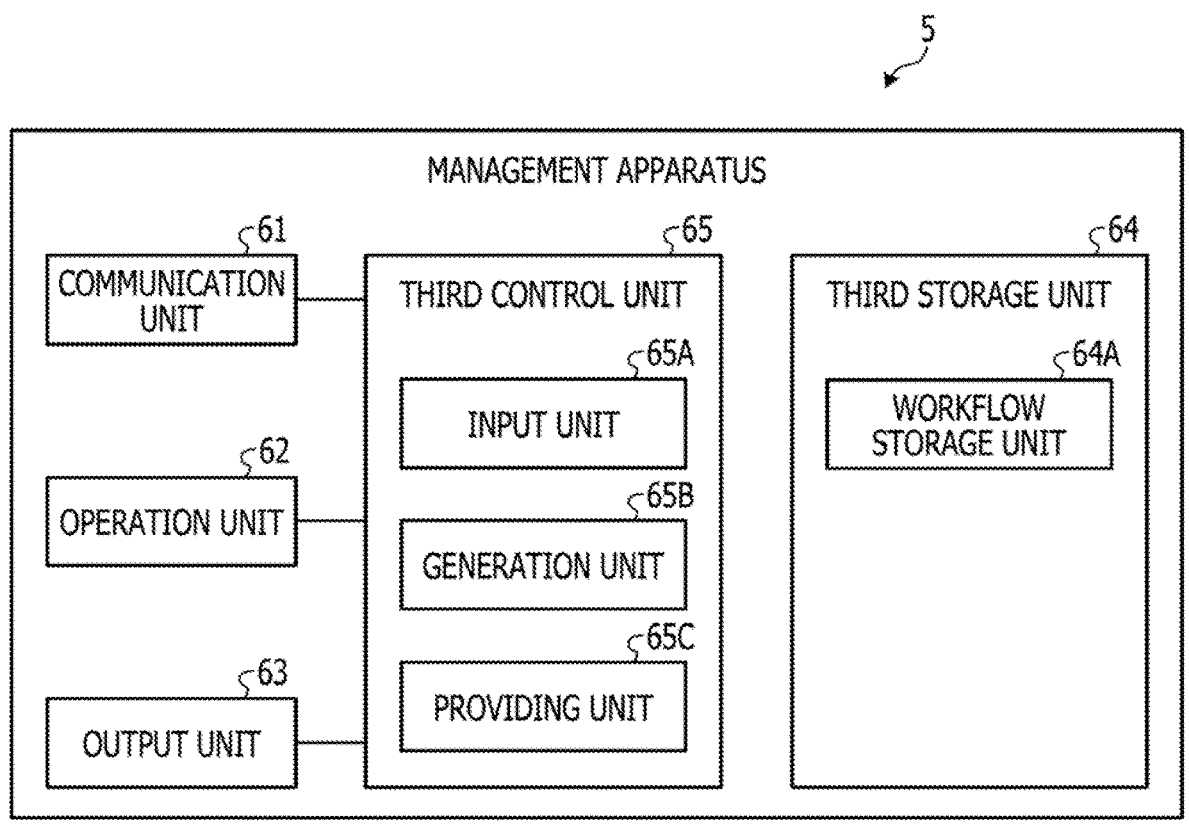
FIG. 6 is an explanatory diagram illustrating an example of a management apparatus.

FIG. 6 is an explanatory diagram illustrating an example of the management apparatus 5. The management apparatus 5 illustrated in FIG. 6 includes a communication unit 61, an operation unit 62, an output unit 63, a third storage unit 64, and a third control unit 65. The communication unit 61 is, for example, a communication IF that couples the management apparatus 5 to the user terminal apparatus 2 and the control apparatus 4 by communication. The operation unit 62 is an input IF that receives various commands as inputs. The output unit 63 is an output IF that outputs various kinds of information by sound or display. The third storage unit 64 is a storage area that stores various kinds of information. The third control unit 65 controls the entire management apparatus 5. The third storage unit 64 includes a workflow storage unit 64A that stores a workflow for a user and for to-be-updated attribute information.

The third control unit 65 includes an input unit 65A, a generation unit 65B, and a providing unit 65C. In response to detection of a workflow generation request transmitted from the user terminal apparatus 2, the input unit 65A receives, as inputs, a first list, a second list, the number of electronic certificates for each business entity, and a procedure time for each business entity. The first list is a list of a group of business entities that perform identity verification of the user. The second list is a list of a group of business entities that cooperate with a plurality of other business entities in terms of identity verification of the user. The number of electronic certificates for each business entity is the number of electronic certificates (proofs), for each business entity, that are issued by other business entities, that certify user ID information, and that are used to complete identity verification of the user. The procedure time is a procedure time taken for user-based identity verification for individual business entities.

The generation unit 65B generates a workflow, based on the first list, the second list, the number of electronic certificates for each business entity, and the procedure time. The workflow is a flow that minimizes the procedure time taken by the target business entities to complete the identity verification of the user and that describes a distribution procedure of electronic certificates (proofs) used in identity verification of the user by the individual business entities.

The providing unit 65C presents the workflow generated by the generation unit 65B to the user terminal apparatus 2 that has issued the workflow generation request. The providing unit 65C transmits the agreed workflow that is agreed to by the user terminal apparatus 2 to the control apparatus 4.

The generation unit 65B generates the above-described workflow using a mathematical programming algorithm, for example. Therefore, inputs, design variables, an objective function, and constraint expressions, which are a construction example of the mathematical programming algorithm, will be described in detail below.

The inputs include (expression 1) indicating a condition for completing the procedure at each business entity (setting variable∈Z), (expression 2) indicating the degree of trust expected for the identity verification procedure, and (expression 3) indicating the time taken for the identity verification procedure.

$$\begin{bmatrix} c_1 \\ c_2 \\ \vdots \\ c_{N-1} \\ c_N \end{bmatrix} \quad \text{(Expression 1)}$$

$$\begin{bmatrix} g_1 \\ g_2 \\ \vdots \\ g_{N-1} \\ g_N \end{bmatrix} \quad \text{(Expression 2)}$$

$$\begin{bmatrix} f_1 \\ f_2 \\ \vdots \\ f_{N-1} \\ f_N \end{bmatrix} \quad \text{(Expression 3)}$$

The condition for completing the procedure at each business entity corresponds to, for example, a condition on which each business entity completes identity verification using n or more successfully verified electronic certificates (proofs). The degree of trust expected for the identity verification procedure is, for example, information for each business entity indicating the number of electronic certificates (proofs) the user-based identity verification procedure corresponds to. The time taken for the identity verification procedure is, for example, information indicating the time taken by each business entity for the user-based identity verification procedure through a procedure at a window or sending of a confirmation document.

It is assumed that target business entities that perform identity verification of the user are business entities 1 to N. For example, it is assumed that in a case where the electronic certificate of the user ID information is transmitted from a business entity i to a business entity j and the business entity j permits electronic-certificate-based identity verification, a node pair (i, j) is included in a set E. The set E enables cooperation between the business entities based on the trust relationship (i, j)∈E=>i→j. The number of electronic certificates used by the business entity i to assume that identity verification of the user has been completed is input to the algorithm as $C_i$. The number of electronic certificates the degree of contribution of execution of the user-based identity verification procedure to the completion of the identity verification corresponds to is input to the algorithm as $g_i$. The time taken for the user-based identity verification procedure is input to the algorithm as $f_i$.

The design variables include a link design variable {0, 1} (expression 4) indicating a procedure to be executed in a phase p, a design variable {0, 1} (expression 5) indicating the presence or absence of the identity verification procedure for each business entity, and a node design variable {0, 1} (expression 6) indicating the procedure completion state at each business entity. The link design variable is, for example, information on destinations to which each business entity transmits the electronic certificate. The design variable indicating the presence or absence of the identity verification procedure is, for example, information for identifying whether the user-based identity verification procedure is to be performed at a window or the like for the business entity. The node design variable is, for example, information such as a flag for each business entity for identifying whether the identity verification procedure is completed.

$$\begin{bmatrix} x^p_{1,1} & x^p_{1,2} & \cdots & x^p_{1,N-1} & x^p_{1,N} \\ x^p_{2,1} & x^p_{2,2} & \cdots & x^p_{2,N-1} & x^p_N \\ \vdots & \vdots & & & \vdots \\ x^p_{N-1,1} & x^p_{N-1,2} & \cdots & x^p_{N-1,N-1} & x^p_{N-1,N} \\ x^p_{N,1} & x^p_{N,2} & \cdots & x^p_{N,N-1} & x^p_{N,N} \end{bmatrix} \forall p \le H+1 \quad \text{(Expression 4)}$$

$$\begin{bmatrix} z_1 \\ z_2 \\ \vdots \\ z_{N-1} \\ z_N \end{bmatrix} \quad \text{(Expession 5)}$$

$$\begin{bmatrix} y_1 \\ y_2 \\ \vdots \\ y_{N-1} \\ y_N \end{bmatrix} \forall p \le H+1 \quad \text{(Expression 6)}$$

The distribution procedure of the user ID information may be written in a phase cycle. In phase 1, the user-based identity verification procedure is performed. In the subsequent phase p (≥2), the electronic certificate of the user ID information issued by the business entity that has confirmed the identity of the user in the phase p−1 or before is received, and the electronic-certificate-based identity verification procedure is performed. In a graph in which a group of target business entities that perform identity verification is denoted by a set of vertices and the set E is denoted by a set of edges, the maximum value among the shortest path hop lengths of all business entity pairs is denoted by H. Any business entity may reach any business entity by H hops at the maximum. For example, distribution of the electronic certificates to all the business entities completes within the H phases at the maximum. Therefore, the design is made for the procedures of (H+1) phases in total by adding the phase 1 in which the user-based identity verification procedure is performed. The design variable is constituted by (expression 7) which is a binary flag variable.

$$x_{i,j}^n(p=1,\ldots,H+1,i=1,\ldots,N,j=1,\ldots,N),$$

$$y_{i,j}^p(p=1,\ldots,H+1,i=1,\ldots,N,j=1,\ldots,N) \quad \text{(Expression 7)}$$

(Expression 8) indicates that the electronic certificate of the user ID information is transmitted from the business entity i to the business entity j in the phase p.

$$x_{i,j}^p=1 \quad \text{(Expression 8)}$$

(Expression 9) indicates that the electronic certificate of the user ID information is not transmitted from the business entity i to the business entity j in the phase p.

$$x_{i,j}^p=0 \quad \text{(Expression 9)}$$

If $z_i=1$, this indicates that the user performs the user-based identity verification procedure for the business entity i in the phase 1. If $z_i=0$, this indicates that the user does not perform the user-based identity verification procedure for the business entity i.

(Expression 10) indicates that the business entity i completes the identity verification of the user in the phase p or has completed the identity verification in any of the previous phases. The completion of the identity verification includes both or either of the user-based identity verification procedure and the electronic-certificate-based identity verification procedure.

$$y_i^p=1 \quad \text{(Expression 10)}$$

(Expression 11) indicates that the business entity i has not completed the identity verification of the user in the phase p.

$$y_i^p=0 \quad \text{(Expression 11)}$$

The objective function is expressed by (expression 12).

$$\min\{\Sigma_j f_j z_j + \Sigma_p \Sigma_{(i,j)} p x_{i,j}^p + \Sigma_j \Sigma_p \delta y_j^p\} \quad \text{(Expression 12)}$$

The objective function is a mathematical expression that minimizes the sum of three terms. The first term $\Sigma_j f_j z_j$ denotes the sum of the times taken for the user-based identity verification procedures. The second term (expression 13) is a weighted sum of the number of times the electronic certificates of the user ID information are transmitted among the business entities which is weighted by the execution phase.

$$\Sigma_p \Sigma_{i,j} p x_{i,j}^p \quad \text{(Expression 13)}$$

The third term (expression 14) is a term for suppressing violation of the identity verification completion flag. Here, δ denotes a sufficiently small positive number (such as $10^{-3}$).

$$\Sigma_j \Sigma_p \delta y_j^p \quad \text{(Expression 14)}$$

The constraint conditions include a trust relationship condition, a procedure completion condition, an identity verification procedure start condition, procedure associating conditions, and procedure execution conditions of the business entity j.

As indicated by (expression 15), the trust relationship condition is a constraint that limits the transmission of the electronic certificate between the business entities that do not permit cooperation using the electronic certificate of the user ID information.

$$\Sigma_{(i,j) \notin E} x_{i,j}^p = 0 \, \forall p \quad \text{(Expression 15)}$$

As indicated by (expression 16), the procedure completion condition is a condition for completing the identity verification of the user by the final phase for all the target business entities.

$$\Sigma_p y_i^p \geq 1 \, \forall i \quad \text{(Expression 16)}$$

As indicated by (expression 17), the identity verification procedure start condition is a condition for causing any of the business entities to perform the user-based identity verification procedure as the start point of the workflow.

$$\Sigma_i z_i \geq 1 \quad \text{(Expression 17)}$$

The procedure associating conditions include (expression 18), (expression 19), and (expression 20).

$$x_{ij}^1 = 0 \, \forall i,j \quad \text{(Expression 18)}$$

$$\Sigma_i x_{i,j}^{p+1} \leq L y_j^p \, \forall i, p \quad \text{(Expression 19)}$$

$$\Sigma_p x_{i,j}^p \leq 1 \, \forall i,j \quad \text{(Expression 20)}$$

The procedure associating condition (expression 18) is a constraint that limits the distribution of the electronic certificate in the phase 1. The procedure associating condition (expression 19) is a constraint that permits a business entity to issue an electronic certificate of the user ID information and to transmit the electronic certificate to any of the other business entities as long as the business entity has completed the identity verification of the user in any of the previous phases. Note that L is a sufficiently large positive value (such as $10^3$). The procedure associating condition (expression 20) is a constraint that limits duplicate transmission of the electronic certificate of the user ID information between the same pair of the business entities.

The procedure execution conditions of the business entity j include (expression 21) and (expression 22).

$$g_j z_j + \Sigma_i \Sigma_{k \leq p} \{x_{i,j}^k\} - c_j L y_j^p \, \forall j, p \quad \text{(Expression 21)}$$

$$g_j z_j + \Sigma_i \Sigma_{k \leq p} \{x_{i,j}^k\} \geq c_j y_j^p \, \forall j, p \quad \text{(Expression 22)}$$

The procedure execution condition (expression 21) of the business entity j is a constraint for setting a flag indicating the completion of identity verification as in (expression 23) in the phase p in which the condition for the completion of identity verification for the business entity j is satisfied in response to receipt of the defined number or more of electronic certificates (proofs) used by the business entity j to complete the identity verification, in response to the user-based identity verification procedure as an alternative to the electronic certificates, or in response to receipt of the defined number of electronic certificates (proofs) in addition to the user-based identity verification procedure.

$$y_j^p = 1 \quad \text{(Expression 23)}$$

In the phases p+1, p+2, following the completion of the identity verification, (expression 24) holds.

$$y_j^{p+1} = 1, y_j^{p+2} = 1 \quad \text{(Expression 24)}$$

The procedure execution condition (expression 22) of the business entity j is a constraint that limits setting of the flag indicating the completion of identity verification as in (expression 25) in the phase p in which the condition for the completion of identity verification for the business entity j is not satisfied even in response to receipt of the defined number or more of electronic certificates (proofs) used by the business entity j to complete the identity verification, in response to the user-based identity verification procedure as an alternative to the electronic certificates, and in response to receipt of the defined number of electronic certificates in addition to the user-based identity verification procedure.

$$y_j^p = 0 \quad \text{(Expression 25)}$$

Therefore, (expression 27) indicates the business entity for which the user performs the user-based identity verification procedure in relation to the design variable (expression 26) obtained by solving the optimization problem above. (Expression 28) indicates the business entity that transmits the electronic certificate of the user ID information, the business entity that receives the electronic certificate, and the execution order thereof. The workflow for completing identity verification for all the target business entities is determined.

$$x_{i,j}^p, z_i \quad \text{(Expression 26)}$$

$$i(s, t, z_i = 1) \quad \text{(Expression 27)}$$

$$\{i, j, p\}(s, t, x_{i,j}^p = 1) \quad \text{(Expression 28)}$$

The control apparatus 4 causes the user-based identity verification procedure and the electronic-certificate-based identity verification to be performed in accordance with the workflow, thereby being able to minimize the time taken for the entire procedure of updating the attribute information while minimizing the procedure time taken for the identity verification.

Figure 7:
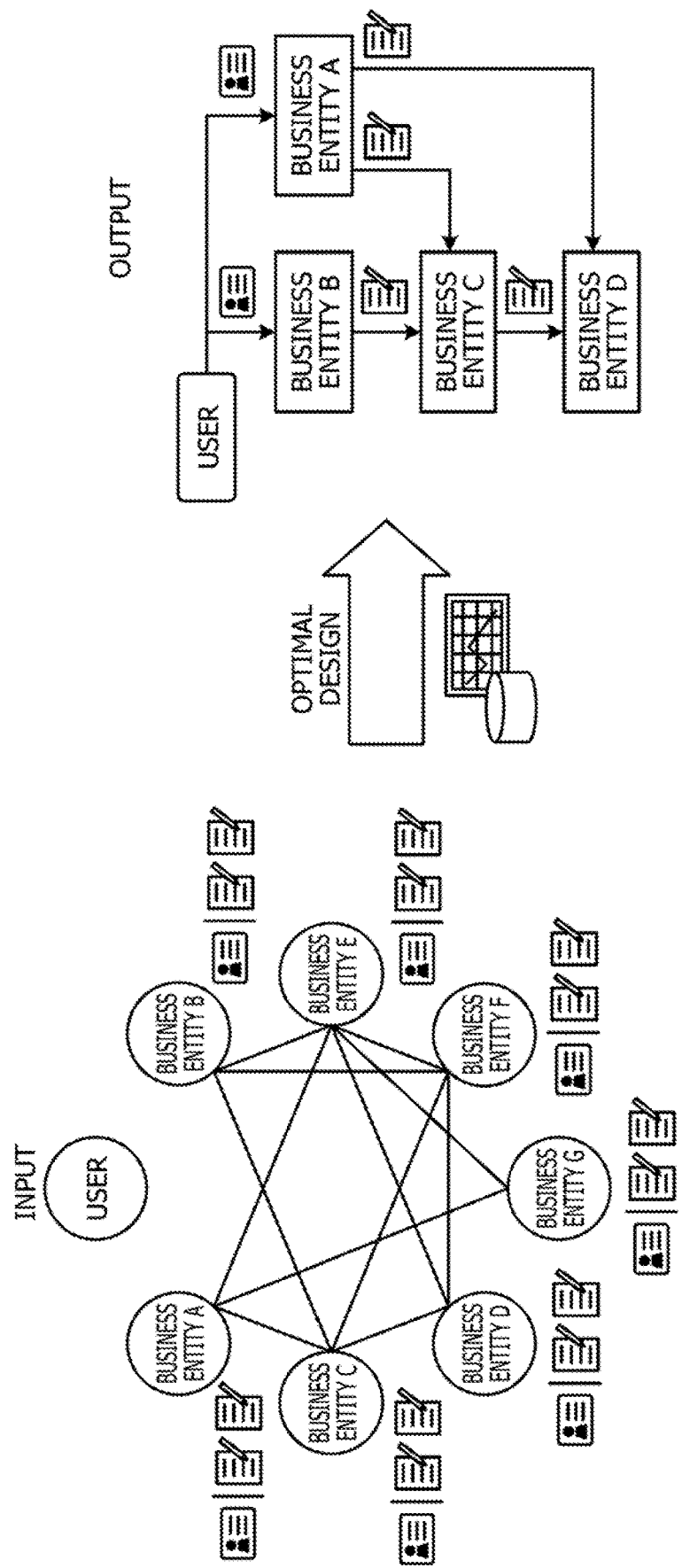
FIG. 7 is an explanatory diagram illustrating an example of a workflow generated by the management apparatus.
Figures 8A, 8B:
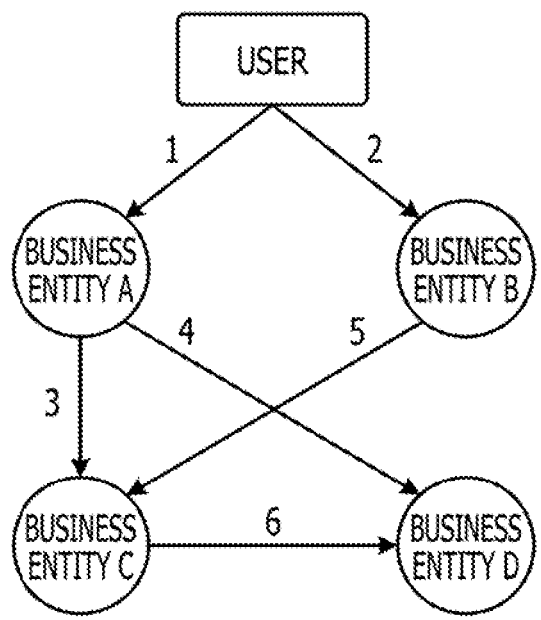
FIG. 8A is an explanatory diagram illustrating an example of written contents of the workflow illustrated in FIG. 7.
FIG. 8B is an explanatory diagram illustrating an example of a distribution procedure in the workflow illustrated in FIG. 8A.

FIG. 7 is an explanatory diagram illustrating an example of a workflow generated by the management apparatus 5. FIG. 8A is an explanatory diagram illustrating an example of written contents of the workflow illustrated in FIG. 7. FIG. 8B is an explanatory diagram illustrating an example of a distribution procedure in the workflow illustrated in FIG. 8A. The management apparatus 5 receives, as inputs, the first list of target business entities that perform identity verification of a user, and a second list of business entities indicating whether cooperation is performed among the business entities in terms of the identity verification of the user. The management apparatus 5 receives, as inputs, the number of electronic certificates (for example, two) used in the identity verification procedure and the procedure time taken by each business entity to perform the user-based identity verification. It is assumed that the first list includes, for example, the business entity A, the business entity B, the business entity C, and the business entity D. The generation unit 65B of the management apparatus 5 selects the target business entities that are requested to perform identity verification of a user from among the plurality of business entities, and generates a workflow that minimizes the time taken by all the business entities to complete the identity verification of the user.

In the workflow illustrated in FIG. 8B, the user performs user-based identity verification for the business entity A. When the business entity A updates the attribute information after the completion of the user-based identity verification, the control apparatus 4 issues a proof for certifying the electronic certificate issued by the business entity A to the business entities C and D. Then, the user performs user-based identity verification for the business entity B. When the business entity B updates the attribute information after the completion of the user-based identity verification, the control apparatus 4 issues a proof for certifying the electronic certificate issued by the business entity B to the business entity C. Then, the business entity C performs electronic-certificate-based identity verification, by using the proof for certifying the electronic certificate issued by the business entity A and the proof for certifying the electronic certificate issued by the business entity B. When the business entity C updates the attribute information after the completion of the electronic-certificate-based identity verification, the control apparatus 4 issues a proof for certifying the electronic certificate issued by the business entity C to the business entity D. The business entity D performs electronic-certificate-based identity verification, by using the proof for certifying the electronic certificate issued by the business entity A and the proof for certifying the electronic certificate issued by the business entity C, When the business entity D updates the attribute information after the completion of the electronic-certificate-based identity verification, all the business entities complete the identity verification of the user and updating of the attribute information.

Figure 9:
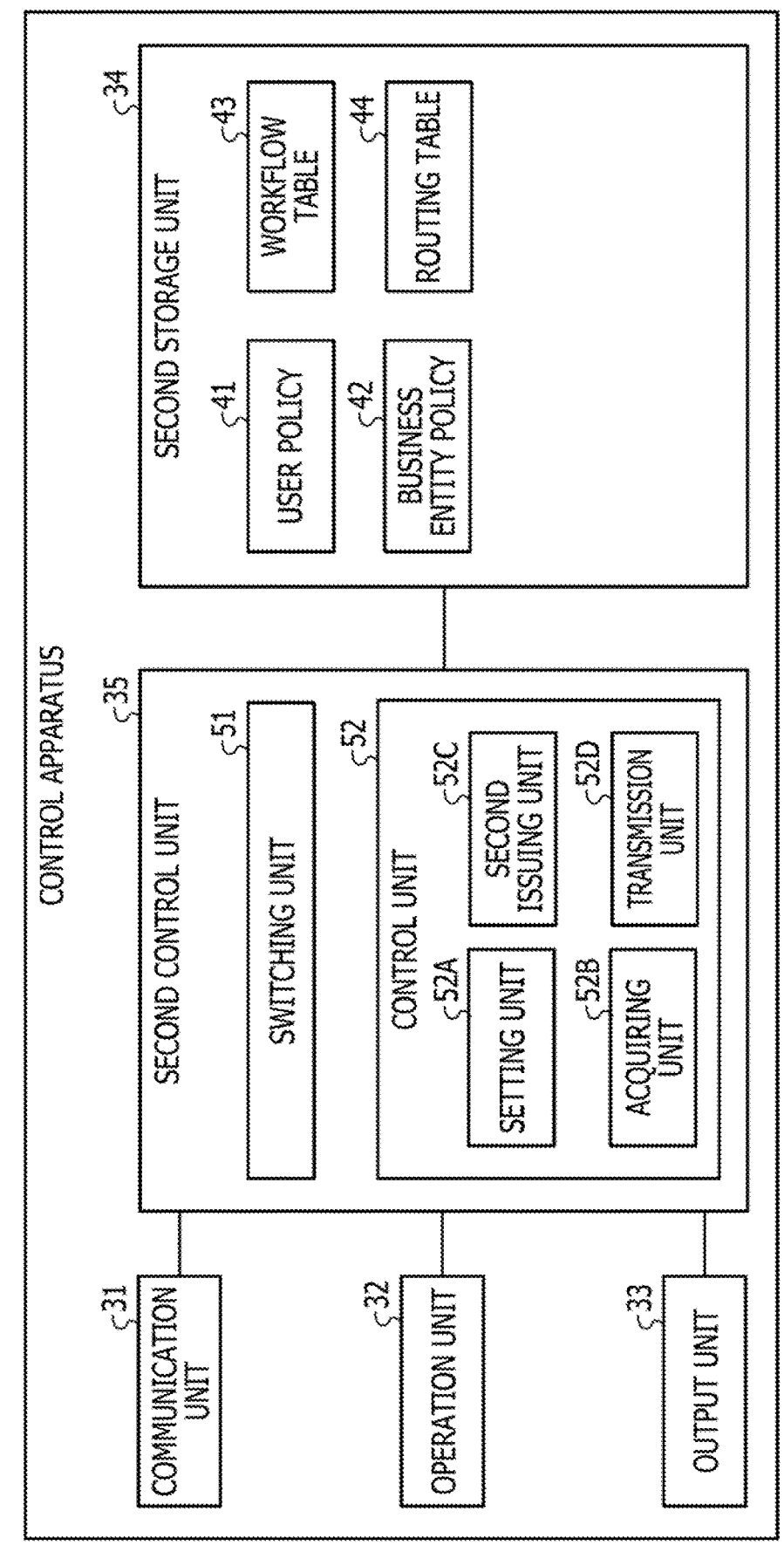
FIG. 9 is an explanatory diagram illustrating an example of a control apparatus.

FIG. 9 is an explanatory diagram illustrating an example of the control apparatus 4. The control apparatus 4 illustrated in FIG. 9 includes a communication unit 31, an operation unit 32, an output unit 33, a second storage unit 34, and a second control unit 35. The communication unit 31 is, for example, a communication IF that couples the control apparatus 4 to the user terminal apparatus 2, the business entity terminal apparatuses 3, and the management apparatus 5 by communication. The operation unit 32 is an input IF that receives various commands as inputs. The output unit 33 is an output IF that outputs various kinds of information by sound or display. The second storage unit 34 is a storage area that stores various kinds of information. The second control unit 35 controls the entire control apparatus 4.

The second storage unit 34 includes a user policy 41, a business entity policy 42, a workflow table 43, and a routing table 44. The user policy 41 is, for example, a policy table in which the user specifies the business entity whose attribute information is to be updated/specifies business entities to cooperate with one another in terms of the electronic certificates (proofs). The business entity policy 42 is a table that manages the candidates for the cooperation destination(s) (the destination(s) that receive(s) the electronic certificate of the user ID information) and the number of electronic certificates (proofs) used for the update, which are designated by the business entity. The business entity policy 42 includes, to complete the identity verification, for example, a condition indicating that proofs of the user ID information are to be received from n or more business entities, a condition indicating that cooperation of the user ID information is to be accepted for the designated business entities, and a condition indicating that a user-based identity verification procedure is to be performed. It is assumed that the management apparatus 5 obtains various kinds of information such as the first list, the second list, the number of electronic certificates, and the procedure time used to generate the workflow, from the user policy 41 and the business entity policy 42 stored in the control apparatus 4.

The workflow table 43 is a table that manages to-be-updated attribute information requested by the user and the workflow agreed to by the user and received from the management apparatus 5. The routing table 44 is, for example, a table that manages destination addresses of the respective business entity terminal apparatuses 3.

The second control unit 35 includes a switching unit 51 and a control unit 52. The switching unit 51 refers to the routing table 44 and transmits various kinds of information to the business entity terminal apparatus 3. The control unit 52 controls the entire second control unit 35.

The control unit 52 includes a setting unit 52A, an acquiring unit 52B, a second issuing unit 52C, and a transmission unit 520. The setting unit 52A sets the workflow that is input from the management apparatus 5 and which the user has agreed to, and the to-be-updated attribute information of the user. The acquiring unit 52B requests the business entity terminal apparatus 3 to issue an electronic certificate for certifying the user ID information in response to a notification indicating the completion of updating of the attribute information notified from the business entity terminal apparatus 3. The acquiring unit 52B acquires the electronic certificate issued by the business entity terminal apparatus 3 in response to the electronic certificate issuance request. The second issuing unit 52C issues a proof for certifying the electronic certificate issued by the business entity and acquired by the acquiring unit 52B. The transmission unit 520 transmits the proof to each business entity deployed immediately under the business entity that has issued the electronic certificate serving as the basis of the proof, in accordance with the distribution procedure.

FIG. 10 is an explanatory diagram illustrating an example of the routing table 44 in the control apparatus 4. The routing table 44 illustrated in FIG. 10 manages a terminal ID 44A and an address 44B in association with each other. The terminal ID 44A is, for example, an ID for identifying each of the business entity terminal apparatuses 3, the switching unit 51, and the control unit 52. The address 44B is, for example, an IP address for identifying an address of each of the business entity terminal apparatuses 3, the switching unit 51, and the control unit 52.

When the control apparatus 4 receives the electronic certificate issued by the business entity A from the business entity terminal apparatus 3A and transmits the proof for the electronic certificate to the business entity terminal apparatus 3C, the electronic certificate issued by the business entity A is transmitted in a route of the business entity terminal apparatus 3A to the switching unit 51 then to the control unit 52. The control apparatus 4 also transmits the proof for the electronic certificate issued by the business entity A in a route of the control unit 52 to the switching unit 51 then to the business entity terminal apparatus 3C. Therefore, the business entity terminal apparatus 3A and the business entity terminal apparatus 3C just have to recognize only the address of the switching unit 51 of the control apparatus 4, and do not have to recognize the addresses of the counterpart business entity terminal apparatuses 3. Security may be improved by avoiding a situation in which the address of the business entity terminal apparatus 3C leaks from the business entity terminal apparatus 3A that is the electronic certificate transmission source, for example.

Figure 11:
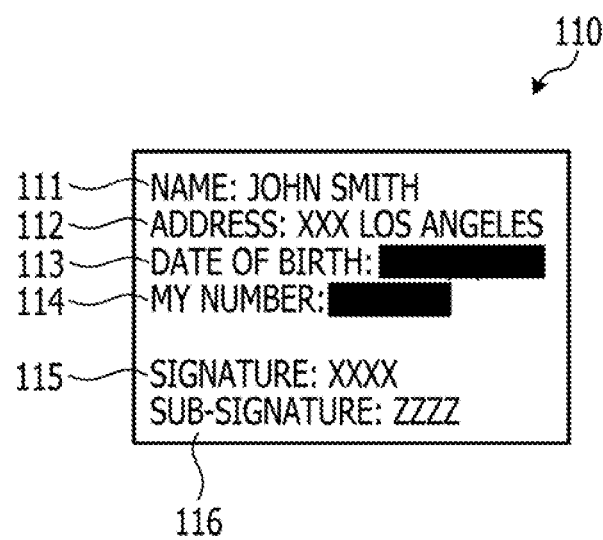
FIG. 11 is an explanatory diagram illustrating an example of a proof issued by the control apparatus.

FIG. 11 is an explanatory diagram illustrating an example of the proof issued by the control apparatus 4. The second issuing unit 52C of the control apparatus 4 verifies the electronic certificate acquired from the business entity terminal apparatus 3, using the public key of the business entity that is the electronic certificate issuer. When the authenticity of the electronic certificate issued by the business entity is confirmed, the second issuing unit 52C fills in black the attribute information that is not related to the to-be-updated attribute information in the electronic certificate to issue a proof. For convenience of explanation, it is assumed that the electronic certificate is an electronic certificate issued by the business entity A and the to-be-updated attribute information is "address". A proof 110 illustrated in FIG. 11 corresponds to a proof for certifying the electronic certificate issued by the business entity A. The proof 110 includes a name 111, an address 112, a date of birth 113, a My Number 114, a signature 115, and a sub-signature 116. The name 111 and the address 112 are related to the to-be-updated attribute information and are left untouched. The date of birth 113 and the My Number 114 are attribute information that is not related to the to-be-updated attribute information and are filled in black. The signature 115 is a signature of the business entity that has issued the certified electronic certificate. The sub-signature 116 is a signature of the control apparatus 4 that has issued the proof 110. The second issuing unit 52C encrypts the proof using the private key of the business entity A that has issued the electronic certificate 100 and the private key of the control apparatus 4 that has issued the proof 110.

Based on the workflow, the control apparatus 4 transmits the issued proof 110 to the subsequent business entity terminal apparatus 3. For example, when receiving the proof 110 for certifying the electronic certificate issued by the business entity from the control apparatus 4, each business entity terminal apparatus 3 decrypts the proof 110 using the public key of the business entity whose signature is included in the proof 110 and the public key of the control apparatus 4 to verify the proof 110.

Figure 12:
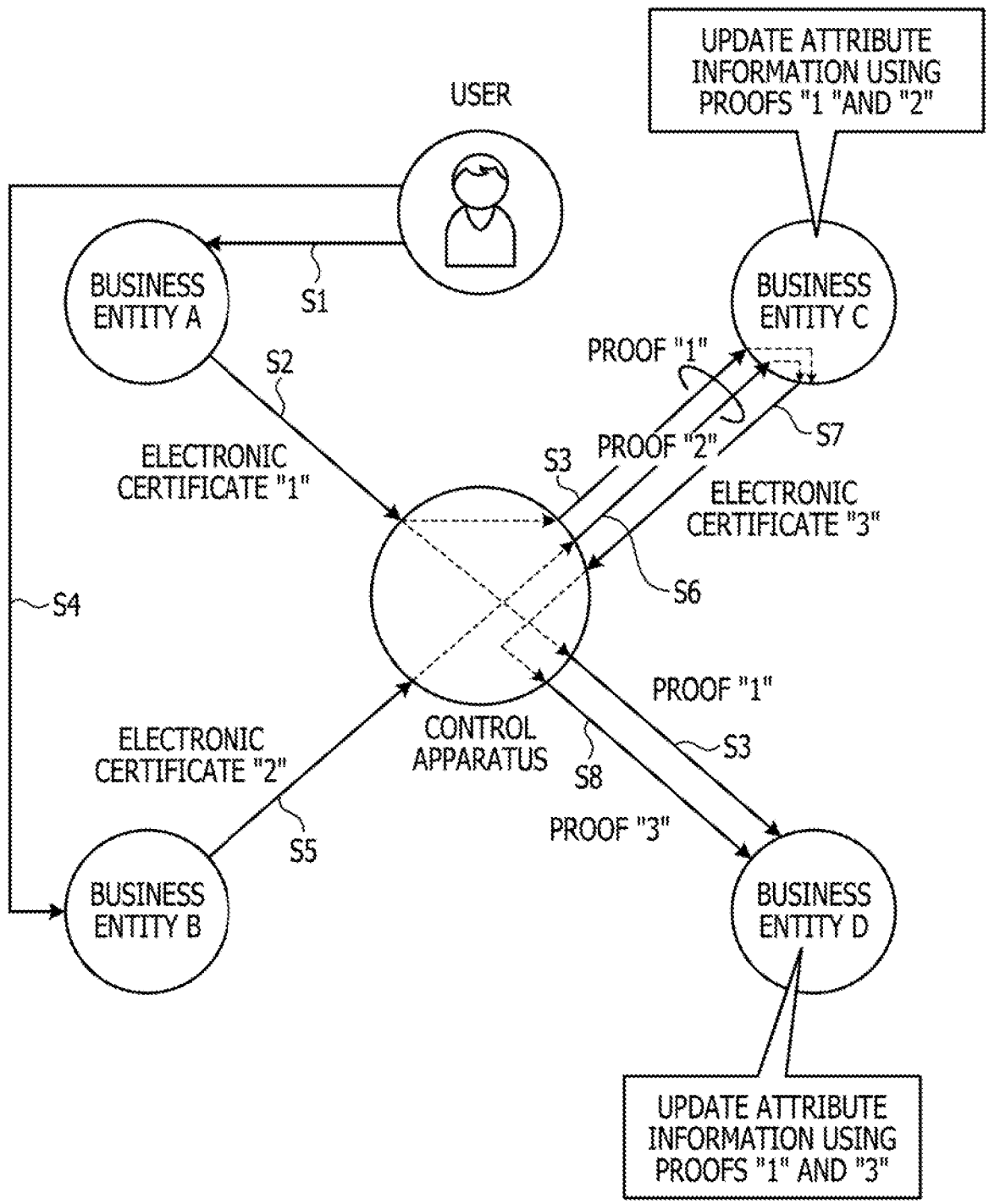
FIG. 12 is an explanatory diagram illustrating an example of an operation performed by the ID distribution system when attribute information is updated in accordance with a workflow.

An operation performed by the ID distribution system 1 according to the present embodiment will be described next. FIG. 12 is an explanatory diagram illustrating an example of the operation performed by the ID distribution system 1 when the attribute information is updated in accordance with the workflow. The management apparatus 5 sets the workflow agreed to by the user in the control apparatus 4. In accordance with the workflow, the control apparatus 4 instructs the user terminal apparatus 2 of the user to perform a user-based identity verification procedure for the business entity A to update the attribute information. The user performs user-based identity verification for the business entity A (step S1). In response to the completion of the user-based identity verification, the business entity A updates the attribute information stored in the business entity A, and then issues an electronic certificate to the control apparatus 4 (step S2). The business entity A updates the attribute information of the user stored in the attribute information storage unit 24A with the attribute information contained in the confirmation document. In response to receipt of the electronic certificate issued by the business entity A, the control apparatus 4 issues a proof for certifying the electronic certificate issued by the business entity A to the business entities C and D in accordance with the workflow (step S3). In response to receipt of the proof for certifying the electronic certificate issued by the business entity A, the business entities C and D verify the proof and store the successfully verified proof in the verification storage unit 24B.

In accordance with the workflow, the control apparatus 4 also instructs the user terminal apparatus 2 of the user to perform a user-based identity verification procedure for the business entity B to update the attribute information. The user performs user-based identity verification for the business entity B (step S4). In response to the completion of the user-based identity verification, the business entity B updates the attribute information stored in the business entity B, and then issues an electronic certificate to the control apparatus 4 (step S5). The business entity B updates the attribute information of the user stored in the attribute information storage unit 24A with the attribute information contained in the confirmation document. In response to receipt of the electronic certificate issued by the business entity B, the control apparatus 4 issues a proof for certifying the electronic certificate issued by the business entity B to the business entity C in accordance with the workflow (step S6). In response to receipt of the proof for certifying the electronic certificate issued by the business entity B, the business entity C verifies the proof and stores the successfully verified proof in the verification storage unit 24B.

The business entity C performs electronic-certificate-based identity verification by using the successfully verified proof for certifying the electronic certificate issued by the business entity A and the successfully verified proof for certifying the electronic certificate issued by the business entity B. In response to the completion of the electronic-certificate-based identity verification, the business entity C updates the attribute information stored in the business entity C, and then issues the electronic certificate to the control apparatus 4 (step S7). The business entity C updates the attribute information of the user stored in the attribute information storage unit 24A with the attribute information contained in the successfully verified proof. In response to receipt of the electronic certificate issued by the business entity C, the control apparatus 4 issues a proof for certifying the electronic certificate issued by the business entity C to the business entity D in accordance with the workflow (step S8). In response to receipt of the proof for certifying the electronic certificate issued by the business entity C, the business entity D verifies the proof and stores the successfully verified proof in the verification storage unit 24B.

The business entity D performs electronic-certificate-based identity verification by using the successfully verified proof for certifying the electronic certificate issued by the business entity A and the successfully verified proof for certifying the electronic certificate issued by the business entity C. In response to the completion of the electronic-certificate-based identity verification, the business entity D updates the attribute information stored in the business entity D. As a result, the business entities A, B, C, and D may update the attribute information of the user by performing the user-based identity verification as less as possible.

Figure 14A:
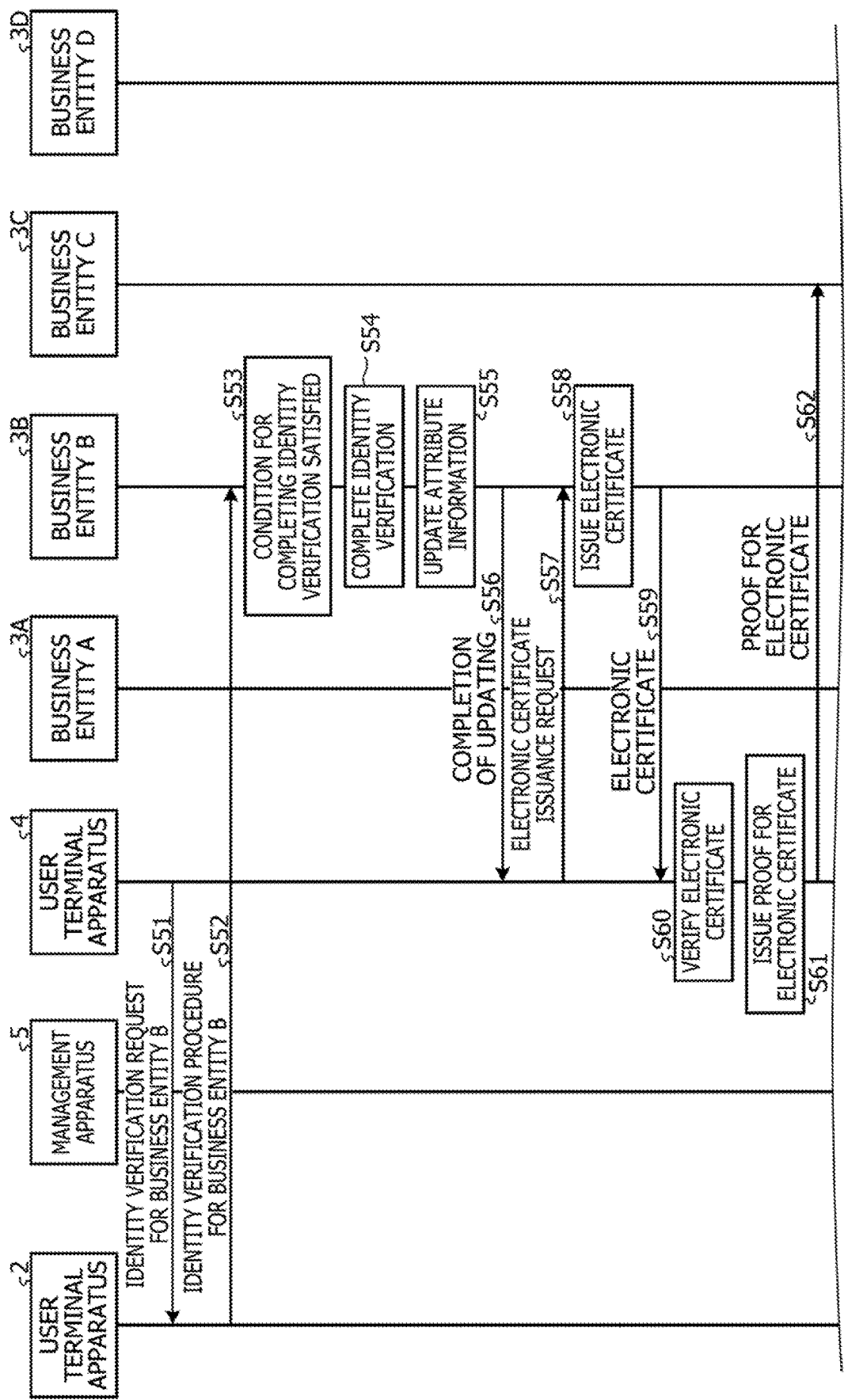
Figure 14B:
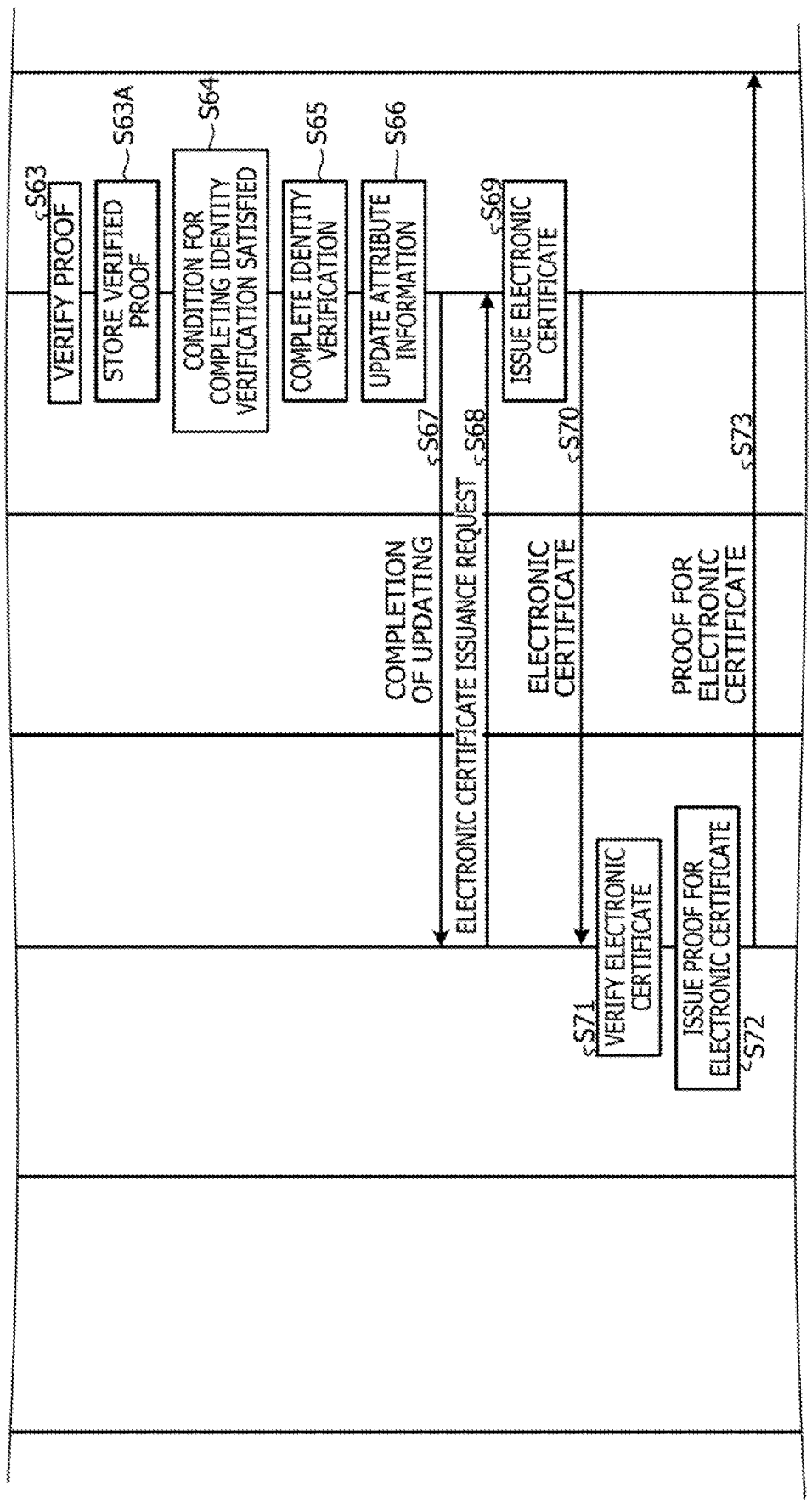

FIGS. 13 and 14 are sequence diagrams illustrating an example of the attribute information updating operation performed by the ID distribution system 1. For convenience of explanation, it is assumed that the to-be-updated attribute information of the user is managed in a distributed manner by the business entity A, the business entity B, the business entity C, and the business entity D among the plurality of business entities.

The user terminal apparatus 2 transmits a workflow generation request for the to-be-updated attribute information to the management apparatus 5 (step S31). In response to detection of the workflow generation request, the generation unit 65B of the management apparatus 5 generates a workflow for updating the attribute information of the user, based on the to-be-updated attribute information, the design variables, the input conditions, the constraint conditions, and the objective function (step S32). For convenience of explanation, the workflow is, for example, a procedure of the business entity A, the business entity B, the business entity C, and to the business entity D as illustrated in FIG. 12.

After the generation of the workflow, the providing unit 65C of the management apparatus 5 presents the generated workflow to the user terminal apparatus 2 (step S33). In response to detection of an agreement operation on the user terminal apparatus 2 to the presented workflow (step S34), the providing unit 65C transmits the user agreed workflow and the to-be-updated attribute information (attribute name and attribute value) of the user to the control apparatus 4 (step S35). The attribute name is, for example, "address", and the attribute value is, for example, "XXX Los Angeles".

In response to receipt of the agreed workflow and the to-be-updated attribute information from the management apparatus 5, the control apparatus 4 stores and sets the agreed workflow and the to-be-updated attribute information in the workflow storage unit 64A (step S36). The control apparatus 4 refers to the distribution procedure in the workflow, and transmits an identity verification request for the business entity A to the user terminal apparatus 2 (step S37). In response to detection of the identity verification request for the business entity A transmitted in step S37, the user of the user terminal apparatus 2 performs a user-based identity verification procedure for the business entity A (step S38). The user-based identity verification procedure is, for example, submission of a confirmation document to a reception window of the business entity A or the like.

In response to detection of the identity verification procedure relating to the to-be-updated attribute information of the user, the business entity terminal apparatus 3A of the business entity A determines whether the condition for completing identity verification is satisfied. If the condition for completing identity verification is satisfied (step S39), the business entity terminal apparatus 3A of the business entity A determines that the identity verification of the user is successful and completes the identity verification (step S40). After the completion of the identity verification, the business entity terminal apparatus 3A updates the attribute information of the user stored in the attribute information storage unit 24A with the to-be-updated attribute information of the user (step S41).

In response to the updating of the attribute information of the user, the business entity terminal apparatus 3A of the business entity A transmits a notification indicating the completion of updating of the attribute information to the control apparatus 4 (step S42). In response to receipt of the notification indicating the completion of updating of the attribute information from the business entity terminal apparatus 3A of the business entity A, the control apparatus 4 determines whether updating of the to-be-updated attribute information is completed at all the business entities included in the workflow.

If it is determined that updating of the to-be-updated attribute information is not completed at all the business entities included in the workflow, the control apparatus 4 transmits an electronic certificate issuance request to the business entity terminal apparatus 3A of the business entity A (step S43). The first issuing unit 25B of the business entity terminal apparatus 3A of the business entity A issues the electronic certificate of the business entity A that has updated the attribute information if the electronic certificate issuance request is received from the control apparatus 4 (step S44). The first issuing unit 25B encrypts the electronic certificate issued by the business entity A, using the private key of the business entity A. The first issuing unit 25B transmits the electronic certificate issued by the business entity A to the control apparatus 4 (step S45).

In response to receipt of the electronic certificate issued by the business entity A, the acquiring unit 52B of the control apparatus 4 verifies the electronic certificate issued by the business entity A, using the public key of the business entity A (step S46). The acquiring unit 52B determines that the verification is successful when the electronic certificate issued by the business entity A is successfully decrypted using the public key of the business entity A. If the verification of the electronic certificate issued by the business entity A is successful, the second issuing unit 52C of the control apparatus 4 issues a proof for certifying the electronic certificate issued by the business entity A (step S47). The second issuing unit 52C fills in black attribute information other than the to-be-updated attribute information "address" and "name" in the electronic certificate issued by the business entity A, encrypts the proof using the private key of the business entity A and the private key of the control apparatus 4, and issues the encrypted proof. The second issuing unit 52C refers to the distribution procedure in the workflow, and transmits the proof for certifying the electronic certificate issued by the business entity A to the business entity terminal apparatus 3C of the business entity C (step S48).

In response to receipt of the proof for certifying the electronic certificate issued by the business entity A from the control apparatus 4, the verification unit 25C of the business entity terminal apparatus 3C of the business entity C verifies the proof for the electronic certificate issued by the business entity A (step S49). If the proof is successfully decrypted using the public key of the business entity A and the public key of the control apparatus 4, the verification unit 25C determines that the verification is successful. If the verification of the proof for the electronic certificate issued by the business entity A is successful, the verification unit 25C stores the proof for certifying the electronic certificate issued by the business entity A in the verification storage unit 24B (step S50).

The second issuing unit 52C of the control apparatus 4 refers to the distribution procedure in the workflow, and transmits the proof for certifying the electronic certificate issued by the business entity A to the business entity terminal apparatus 3D of the business entity D (step S48A). In response to receipt of the proof for certifying the electronic certificate issued by the business entity A from the control apparatus 4, the verification unit 25C of the business entity terminal apparatus 3D of the business entity D verifies the proof for the electronic certificate issued by the business entity A (step S49A). If the verification of the proof for the electronic certificate issued by the business entity A is successful, the verification unit 25C stores the proof for certifying the electronic certificate issued by the business entity A in the verification storage unit 24B (step S50A).

In FIG. 14, after the processing operation illustrated in FIG. 13 is performed, the control apparatus 4 refers to the distribution procedure in the workflow, and transmits an identity verification request for the business entity B to the user terminal apparatus 2 (step S51). In response to detection of the identity verification request for the business entity B transmitted in step S51, the user of the user terminal apparatus 2 performs a user-based identity verification procedure for the business entity B (step S52). The user-based identity verification procedure is, for example, submission of a confirmation document to a reception window of the business entity B or the like.

In response to detection of the identity verification procedure relating to the to-be-updated attribute information of the user, the business entity terminal apparatus 3B of the business entity B determines whether the condition for completing identity verification is satisfied. If the condition for completing identity verification is satisfied (step S53), the business entity terminal apparatus 38 of the business entity B determines that the identity verification of the user is successful and completes the identity verification (step S54). After the completion of the identity verification, the business entity terminal apparatus 38 updates the attribute information of the user stored in the attribute information storage unit 24A with the to-be-updated attribute information of the user (step S55). When the attribute information of the user is updated, the first issuing unit 25B of the business entity terminal apparatus 38 of the business entity B transmits a notification indicating the completion of updating of the attribute information to the control apparatus 4 (step S56). In response to receipt of the notification indicating the completion of updating of the attribute information from the business entity terminal apparatus 3B of the business entity 8, the control apparatus 4 determines whether updating of the to-be-updated attribute information is completed at the business entities included in the workflow.

If it is determined that updating of the to-be-updated attribute information is not completed at all the business entities included in the workflow, the control apparatus 4 transmits an electronic certificate issuance request to the business entity terminal apparatus 38 of the business entity B (step S57). The first issuing unit 25B of the business entity terminal apparatus 39 of the business entity B issues an electronic certificate issued by the business entity B if the electronic certificate issuance request is received from the control apparatus 4 (step S58). The first issuing unit 25B transmits the electronic certificate issued by the business entity B to the control apparatus 4 (step S59). The first issuing unit 25B encrypts the electronic certificate issued by the business entity B, using the private key of the business entity B.

In response to receipt of the electronic certificate issued by the business entity B, the acquiring unit 52B of the control apparatus 4 verifies the electronic certificate issued by the business entity B, using the public key of the business entity B (step S60). The acquiring unit 52B determines that the verification is successful if the electronic certificate issued by the business entity B is successfully decrypted using the public key of the business entity B. If verification of the electronic certificate issued by the business entity B is successful, the second issuing unit 52C of the control apparatus 4 issues a proof for certifying the electronic certificate issued by the business entity B (step S61). The second issuing unit 52C refers to the distribution procedure in the workflow, and transmits the proof for certifying the electronic certificate issued by the business entity B to the business entity terminal apparatus 3C of the business entity C (step S62). The verification unit 25C of the business entity terminal apparatus 3C of the business entity C verifies the proof for certifying the electronic certificate issued by the business entity B (step S63). If the verification of the proof for certifying the electronic certificate issued by the business entity B is successful, the verification unit 25C of the business entity terminal apparatus 3C of the business entity C stores the proof for certifying the electronic certificate issued by the business entity B in the verification storage unit 24B (step S63A).

The updating unit 25A of the business entity terminal apparatus 3C of the business entity C determines whether the proofs stored in the verification storage unit 24B satisfy the condition for completing the identity verification. Based on this condition for completing the identity verification, it is determined that electronic-certificate-based identity verification is completed using the successfully verified proof for certifying the electronic certificate issued by the business entity A and the successfully verified proof for certifying the electronic certificate issued by the business entity B. If the condition for completing the identity verification is satisfied (step S64), the updating unit 25A completes the identity verification (step S65). After the completion of the identity verification, the business entity terminal apparatus 3C updates the attribute information of the user stored in the attribute information storage unit 24A with the to-be-updated attribute information of the user (step S66) If the attribute information of the user is updated, the first issuing unit 25B of the business entity terminal apparatus 3C of the business entity C transmits a notification indicating the completion of updating of the attribute information to the control apparatus 4 (step S67). In response to receipt of the notification indicating the completion of updating of the attribute information from the business entity terminal apparatus 3C of the business entity C, the second issuing unit 52C of the control apparatus 4 determines whether updating of the to-be-updated attribute information is completed at all the business entities included in the workflow.

If it is determined that updating of the to-be-updated attribute information is not completed at all the business entities included in the workflow, the control apparatus 4 transmits an electronic certificate issuance request to the business entity terminal apparatus 3C of the business entity C (step S68). The first issuing unit 25B of the business entity terminal apparatus 3C of the business entity C issues an electronic certificate issued by the business entity C if the electronic certificate issuance request is received from the control apparatus 4 (step S69). The first issuing unit 25B transmits the electronic certificate issued by the business entity C to the control apparatus 4 (step S70). The first issuing unit 25B encrypts the electronic certificate issued by the business entity C, using the private key of the business entity C.

In response to receipt of the electronic certificate issued by the business entity C, the acquiring unit 52B of the control apparatus 4 verifies the electronic certificate issued by the business entity C, using the public key of the business entity C (step S71). The acquiring unit 52B determines that the verification is successful if the electronic certificate issued by the business entity C is successfully decrypted using the public key of the business entity C. If the verification of the electronic certificate issued by the business entity C is successful, the second issuing unit 52C of the control apparatus 4 issues a proof for certifying the electronic certificate issued by the business entity C (step S72).

The second issuing unit 52C refers to the distribution procedure in the workflow, and transmits the proof for certifying the electronic certificate issued by the business entity C to the business entity terminal apparatus 3D of the business entity D (step S73). The verification unit 25C of the business entity terminal apparatus 3D of the business entity D verifies the proof for certifying the electronic certificate issued by the business entity C (step S74). If the verification of the proof for certifying the electronic certificate issued by the business entity C is successful, the verification unit 25C stores the proof for certifying the electronic certificate issued by the business entity C in the verification storage unit 24B (step S74A).

The updating unit 25A of the business entity terminal apparatus 3D of the business entity D determines whether the proofs stored in the verification storage unit 24B satisfy the condition for completing the identity verification. If the condition for completing the identity verification is satisfied (step S75), the updating unit 25A completes the identity verification (step S76). After the completion of the identity verification, the business entity terminal apparatus 3D updates the attribute information of the user stored in the attribute information storage unit 24A with the to-be-updated attribute information of the user (step S77).

If the attribute information is updated, the first issuing unit 25B of the business entity terminal apparatus 3D of the business entity D transmits a notification indicating the completion of updating of the attribute information to the control apparatus 4 (step S78). In response to receipt of the notification indicating the completion of updating of the attribute information from the business entity terminal apparatus 3D of the business entity D, the second issuing unit 52C of the control apparatus 4 determines whether updating of the to-be-updated attribute information is completed at all the business entities included in the workflow.

If updating of the to-be-updated attribute information is completed at all the business entities (step S79), the control apparatus 4 transmits, to the user terminal apparatus 2, an update completion notification indicating that updating of the to-be-updated update information is completed at all the business entities (step S80), and ends the processing operation illustrated in FIG. 14. As a result, the user of the user terminal apparatus 2 may recognize that updating of the attribute information is completed at all the business entities.

In the attribute information updating process, when the business entities A and B update the attribute information of the user managed thereby as a result of the user-based identity verification procedure, the business entities A and B issue electronic certificates and transmit the electronic certificates to the other business entities C and D subsequent to the business entities A and B. The other business entities C and D update the attribute information of the user managed by the other business entities C and D as a result of the electronic-certificate-based identity verification procedure. The other business entity C issues an electronic certificate and distributes the electronic certificate to the different business entity D. By repeating this, the subsequent business entity may perform the electronic-certificate-based identity verification procedure without performing the user-based identity verification procedure, and the attribute information may be updated at all the business entities that manage the attribute information of the user.

Figure 15:
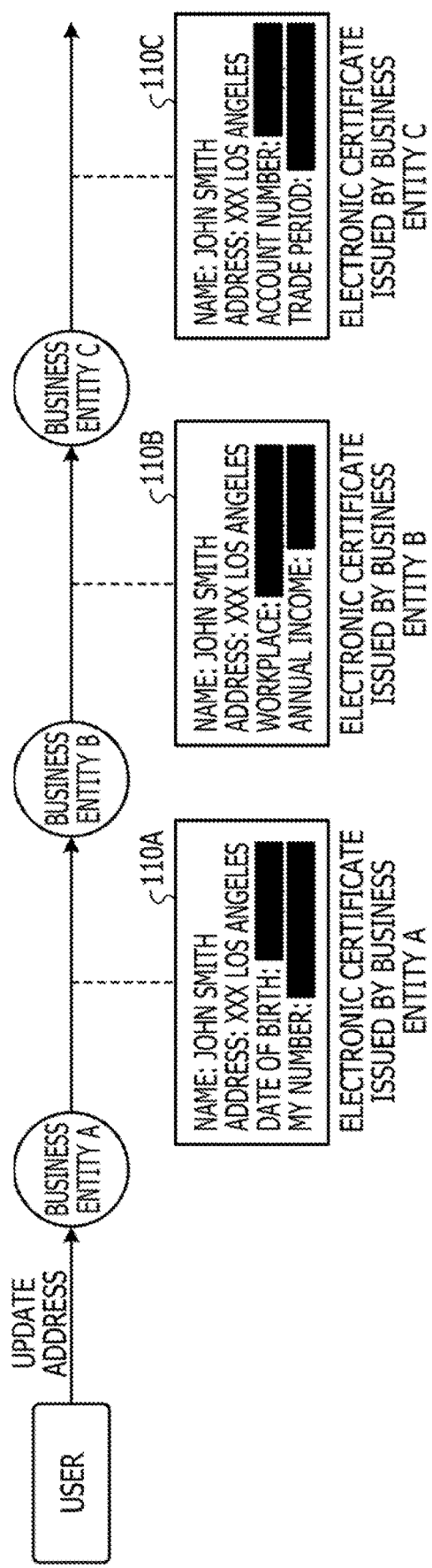
FIG. 15 is an explanatory diagram illustrating an example of proofs issued by the control apparatus for respective business entities in the ID distribution system.

FIG. 15 is an explanatory diagram illustrating an example of proofs issued by the control apparatus 4 for the respective business entities in the ID distribution system 1. In response to acquisition of the electronic certificate issued by the business entity A from the business entity terminal apparatus 3A, the control apparatus 4 leaves the attribute values of "name" and "address" untouched which are to-be-updated attribute information among attribute information contained in the electronic certificate issued by the business entity A. The control apparatus 4 then fills in black the attribute values of "My Number" and "date of birth", which are unnecessary attribute information among the attribute information contained in the electronic certificate, to generate a proof 110A. The control apparatus 4 then transmits the generated proof 110A to the business entity terminal apparatus 3C and the business entity terminal apparatus 3D which are subsequent apparatuses in the distribution procedure in the workflow.

In response to acquisition of the electronic certificate issued by the business entity B from the business entity terminal apparatus 3B, the control apparatus 4 leaves the attribute values of "name" and "address" untouched which are the to-be-updated attribute information among the attribute information contained in the electronic certificate issued by the business entity B. The control apparatus 4 then fills in black the attribute values of "workplace" and "annual income", which are unnecessary attribute information among the attribute information contained in the electronic certificate, to generate a proof 110B. The control apparatus 4 then transmits the generated proof 110B to the business entity terminal apparatus 3C which is a subsequent apparatus in the distribution procedure in the workflow.

In response to acquisition of the electronic certificate issued by the business entity C from the business entity terminal apparatus 3C, the control apparatus 4 leaves the attribute values of "name" and "address" untouched which are the to-be-updated attribute information among the attribute information contained in the electronic certificate issued by the business entity C. The control apparatus 4 then fills in black the attribute values of the "account number" and the "trade period", which are unnecessary attribute information, to generate a proof 110C. The control apparatus 4 then transmits the generated proof 110C to the business entity terminal apparatus 3D which is a subsequent apparatus in the distribution procedure in the workflow.

As a result, the control apparatus 4 may improve the security performance by sequentially transmitting only the to-be-updated attribute information between the business entities by using the electronic certificates issued by the respective business entities and including different kinds of attribute information.

The management apparatus 5 according to the present embodiment generates a workflow of a distribution procedure that minimizes a procedure time taken by target business entities to complete identity verification, based on the first list, the second list, the number of proofs for each business entity, and the procedure time taken for identity verification at each business entity. The distribution procedure is a distribution procedure of the electronic certificates and the proofs used in identity verification at respective business entities. As a result, the burden for identity verification of the user at a plurality of business entities may be reduced.

The management apparatus 5 presents the generated workflow to the user terminal apparatus 2 of the user. As a result, the user may recognize the contents of the generated workflow.

The management apparatus 5 generates a workflow that minimizes the procedure time taken for the completion of the user-based identity verification and the completion of the electronic-certificate-based identity verification which serve as the completion of the identity verification at the target business entities. As a result, the work burden for identity verification of the user may be reduced by using the electronic-certificate-based identity verification.

The management apparatus 5 generates a workflow that describes a distribution procedure for performing the identity verification procedure at each business entity when the attribute information is updated. As a result, the burden for identity verification of the user may be reduced when the attribute information is updated at a plurality of business entities. For example, the total time and the number of executions for the identity verification procedure and updating of the attribute information may be minimized.

The management apparatus 5 generates a workflow, based on the first list, the second list, the number of electronic certificates for each business entity, the procedure time, and the trust relationship condition. As a result, a workflow may be generated that reflects the trust relationship condition on which cooperation between the business entities using the electronic certificates is not permitted.

The management apparatus 5 generates a workflow, based on the first list, the second list, the number of electronic certificates for each business entity, the procedure time, and the start condition. As a result, a workflow may be generated that reflects the start condition for causing the business entity, which is the start point of the distribution procedure in the workflow, to perform the user-based identity verification procedure.

The control apparatus 4 sets a user-agreed workflow that minimizes the procedure time taken for the completion of identity verification of the user at target business entities and that describes a distribution procedure of electronic certificates for certifying user information for the respective business entities. The control apparatus 4 acquires an electronic certificate issued by a business entity when the business entity completes identity verification in accordance with the distribution procedure. The control apparatus 4 issues a proof to be used by the subsequent business entity in the distribution procedure to complete identity verification, based on the acquired electronic certificate. The control apparatus 4 transmits the proof to each business entity deployed immediately under the business entity that has issued the electronic certificate that is the basis of the proof, in accordance with the distribution procedure. As a result, the burden for the identity verification of the user at a plurality of business entities may be reduced by using the electronic-certificate-based identity verification with the proof.

The control apparatus 4 sets a workflow that minimizes the procedure time taken for the completion of the user-based identity verification and the completion of the electronic-certificate-based identity verification which serve as the completion of the identity verification at the target business entities. As a result, the work burden for identity verification of the user may be reduced by using the electronic-certificate-based identity verification.

The control apparatus 4 sets a user-agreed workflow that minimizes the procedure time taken for the completion of the identity verification of the user when the attribute information of the user is updated at the target business entities, and that describes a distribution procedure of electronic certificates for certifying the user information for the respective business entities. The control apparatus 4 acquires an electronic certificate issued by a business entity when the business entity completes identity verification and updates the attribute information, in accordance with the distribution procedure. As a result, the burden for identity verification of the user may be reduced when the attribute information is updated at a plurality of business entities. For example, the total time and the number of executions for the identity verification procedure and updating of the attribute information may be minimized.

The control apparatus 4 issues a proof that includes the to-be-updated attribute information out of the attribute information which is part of the electronic certificate, by making the attribute information other than the to-be-updated attribute information unidentifiable. As a result, privacy protection of the user may be ensured by not disclosing information other than the to-be-updated attribute information to the subsequent business entities in the workflow.

The control apparatus 4 issues a proof that is encrypted using a key that enables verification on the business entity side. As a result, the security against the false proof may be improved by enabling the subsequent business entity to verify the proof.

In the present embodiment, the distribution procedure of the user ID information (the electronic certificates and the proofs) between the business entities is determined for a group of business entities for which the user desires to update their attribute information. The distribution procedure is a procedure that defines for which business entity the user performs the user-based identity verification procedure, from which business entity to which business entity a proof for the user ID information of the user is to be transmitted, and which procedure in which cooperation is performed in terms of the user ID information to complete collective updating of the attribute information without delay. As a result, the time taken for updating the attribute information of the user is reduced by reducing the burden of the user or the business entity for the identity verification procedure.

Under the agreement of the user, a certain business entity issues an electronic certificate of user ID information confirmed through the user-based identity verification procedure, and a proof for the electronic certificate is transmitted to a subsequent business entity in the workflow. The subsequent business entity verifies the received proof to confirm the authenticity of the electronic certificate issuer. Electronic-certificate-based identity verification is performed based on the verification result of the proof. The proof issued to the subsequent business entity is used in the electronic-certificate-based identity verification, and automates the identity verification of the user at the subsequent business entity. As a result, the number of business entities that directly perform user-based identity verification is minimized, and the identity verification procedures at the rest of the business entities are automated. Consequently, the burden for identity verification of the user at the plurality of business entities may be reduced.

The workflow is presented to the user terminal apparatus 2 from the management apparatus 5, and the user terminal apparatus 2 collectively gives an agreement to the entire procedure in the workflow in response to an agreement operation. As a result, the user may simplify the operation for agreeing to the workflow.

For convenience of explanation, in the distribution procedure in the workflow illustrated in FIG. 8A, after the user performs the user-based identity verification procedure for the business entity A, the user performs the user-based identity verification procedure for the business entity B. When the user performs the user-based identity verification procedure for the business entity A, the proof for the electronic certificate issued by the business entity A is issued to the business entity C, and then the proof for the electronic certificate issued by the business entity A is issued to the business entity D. However, the distribution procedure in the workflow is not limited to this, and may be appropriately changed as illustrated in FIGS. 16A and 16B.

Figures 16A, 16B:
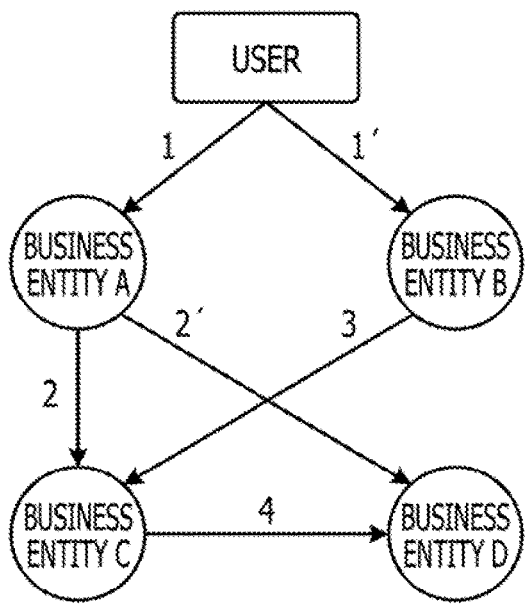
FIG. 16A is an explanatory diagram illustrating another example of written contents of the workflow.
FIG. 16B is an explanatory diagram illustrating an example of a distribution procedure in the workflow illustrated in FIG. 16A.

FIG. 16A is an explanatory diagram illustrating an example of written contents of another workflow. FIG. 16B is an explanatory diagram illustrating an example of a distribution procedure in the workflow illustrated in FIG. 16A. The user may perform the user-based identity verification procedures in parallel for the business entities A and B, and thereafter, the proof for the electronic certificate issued by the business entity A may be issued to the business entities C and D in parallel. As a result, the time taken for the processing may be shortened compared to that of FIGS. 8A and 8B by performing the parallel processing twice.

The example case has been described in which the management apparatus 5 receives, as inputs, at least the first list, the second list, the number of electronic certificates, and the procedure time for identity verification, and generates a workflow based on the input result. However, the embodiments discussed herein are not limited to this. For example, the management apparatus 5 may receive, as inputs, a trust relationship indicating whether there is a trust between the business entities in addition to the first list, the second list, the number of electronic certificates, and the procedure time for identity verification, and the input information may be appropriately changed.

The inputs, the design variables, the objective function, and the constraint expressions in the mathematical programming algorithm for solving the optimization problem are described as examples in relation to the management apparatus 5. The embodiments discussed herein are not limited to these, and the contents of the inputs, the design variables, the objective function, and the constraint expressions may be appropriately changed. The example case is described in which the management apparatus 5 generates a workflow using the mathematical programming algorithm. Alternatively, the management apparatus 5 may determine the workflow using a heuristic method or the like, and the technique used may be appropriately changed.

In the present embodiment, the example case has been described in which the identity verification of the user at each business entity is performed when the plurality of business entities update the attribute information of the user. The embodiments discussed herein are not used limitedly when the attribute information of the user is updated, and may be applied to a situation in which identity verification is to be performed at each business entity.

The constituent elements of the units illustrated in the drawings do not necessarily have to be physically configured as illustrated. For example, specific configurations of dispersion and integration of the respective units are not limited to those illustrated in the drawings, and all or some of the elements may be configured in a functionally or physically dispersed and integrated manner in an arbitrary unit depending on various loads, usage, and the like.

All or arbitrary part of various processing functions performed in each apparatus may be implemented by a central processing unit (CPU), a digital signal processor (DSP), a field programmable gate array (FPGA), or the like. All or arbitrary part of the various processing functions may be implemented by a program analyzed and executed by a CPU or the like, or by hardware of wired logic.

The area that stores various kinds of information may be constituted by, for example, a read-only memory (ROM), or a random access memory (RAM) such as a synchronous dynamic random access memory (SDRAM), a magneto-resistive random access memory (MRAM), or a non-volatile random access memory (NVRAM).

Figure 17:
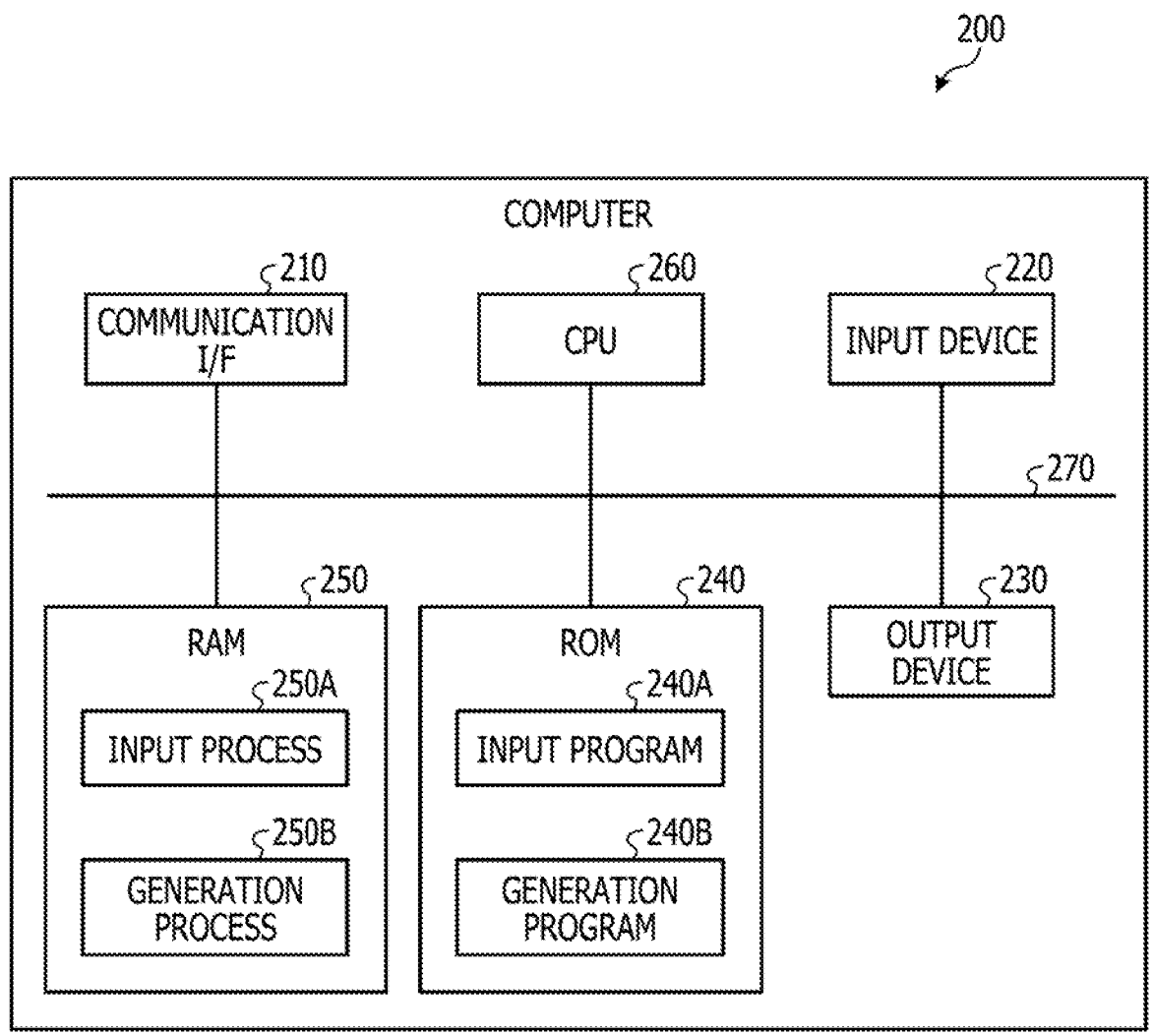
FIG. 17 is a block diagram illustrating an example of a computer that executes an identity verification program.

The various processes described in the present embodiment may be implemented by a processor such as a CPU in a computer executing a program prepared in advance. Accordingly, an example of a computer that executes a program having substantially the same functions as those of the above-described embodiment will be described below. FIG. 17 is a block diagram illustrating an example of a computer that executes the identity verification program.

A computer 200 that executes the identity verification program illustrated in FIG. 17 includes a communication interface (IF) 210, an input device 220, an output device 230, a ROM 240, a RAM 250, and a CPU 260. The communication IF 210, the input device 220, the output device 230, the ROM 240, the RAM 250, and the CPU 260 are coupled to one another via a bus 270. The communication IF 210 communicates with a control apparatus in a communication network. The computer 200 generates a workflow used by a control apparatus of a system in which a plurality of business entities manage, in a distributed manner, attribute information in user information for identifying a user.

The ROM 240 stores in advance the identity verification program that carries out substantially the same functions as those of the above embodiment. The ROM 240 stores an input program 240A and a generation program 240B as the identity verification program. Instead of the ROM 240, the identity verification program may be recorded on a recording medium that is readable by a computer with a drive (not illustrated). The recording medium may be, for example, a compact disc (CD)-ROM, a digital versatile disc (DVD), a portable recording medium such as a Universal Serial Bus (USB) memory, a semiconductor memory such as a flash memory, or the like.

The CPU 260 reads the input program 240A from the ROM 240 and functions as an input process 250A on the RAM 250. The CPU 260 reads the generation program 240B from the ROM 240 and functions as a generation process 250B on the RAM 250.

The CPU 260 receives, as inputs, the first list, the second list, the number of electronic certificates, for each business entity, that certify user information and are used to complete identity verification, and a procedure time taken for identity verification at each business entity. The first list is a list of business entities that perform identity verification of the user. The second list is a list of business entities indicating whether cooperation is to be performed among a plurality of business entities for identity verification of the user. Based on the first list, the second list, the number of electronic certificates for each business entity, and the procedure time, the CPU 260 generates a workflow that minimizes the procedure time taken for the target business entities to complete identity verification and that describes a distribution procedure of electronic certificates used in the identity verification at the individual business entities. As a result, the burden for identity verification of the user at a plurality of business entities may be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an identity verification program for causing a computer to execute a process, the computer being configured to generate a workflow used by a control apparatus that controls a system in which a plurality of business entities manage, in a distributed manner, attribute information in user information that identifies a user, the process comprising:

receiving, as inputs, a first list of target business entities that perform identity verification of the user, a second list of business entities indicating whether cooperation is performed among a plurality of business entities for the identity verification of the user, a number of electronic certificates that certify the user information and are used by each of the business entities to complete the identity verification, and a procedure time taken by each of the business entities for the identity verification; and generating, based on the first list, the second list, the number of electronic certificates for each of the business entities, and the procedure time, a workflow that minimizes a procedure time taken for completion of the identity verification by the target business entities and that describes a distribution procedure of the electronic certificates that are used in the identity verification at each of the business entities, wherein the cooperation includes an electronic-certificate-based identity verification in which the identity verification of the user is completed in response to verification of one or more electronic certificates transmitted from one or more other business entities, among those on the second list, as described in the generated workflow, and wherein the generated workflow describes, as the distribution procedure, which business entity, among those on the second list, performs a user-based identity verification in which the user involves and which business entity, among those on the second list, performs the electronic-certificate-based identity verification, and from which business entity to which business entity, among those on the second list, the electronic certificate is to be issued.

2. The computer-readable recording medium according to claim 1, the process further comprising:
presenting the generated workflow to a user terminal apparatus of the user.

3. The computer-readable recording medium according to claim 1, wherein
in the generating of the workflow,
the workflow is generated that minimizes a procedure time taken for completion of the user-based identity verification in which the user involves and completion of the electronic-certificate-based identity verification using the electronic certificates, as the completion of the identity verification by the target business entities.

4. The computer-readable recording medium according to claim 3, wherein
in the receiving, the first list is a list of target business entities that perform user-based identity verification of the user when attribute information of the user is updated.

5. The computer-readable recording medium according to claim 1, wherein
the number of electronic certificates that are used in the identity verification by each of the business entities is a number of successfully verified subsets that are verified by another business entity and include part of attribute information contained in the electronic certificates that certify the user information of the user.

6. The computer-readable recording medium according to claim 1, wherein
in the receiving,
a start condition on which a business entity serving as a start point of the distribution procedure in the workflow is caused to perform an identity verification procedure in which the user involved is received as an input, and
in the generating of the workflow,
the workflow is generated based on the first list, the second list, the number of electronic certificates for each of the business entities, the procedure time, and the start condition.

7. A management apparatus for generating a workflow used by a control apparatus that controls a system in which a plurality of business entities manage, in a distributed manner, attribute information in user information that identifies a user, the apparatus comprising:
a memory, and
a processor coupled to the memory and configured to:
receive, as inputs, a first list of target business entities that perform identity verification of the user, a second list of business entities indicating whether cooperation is performed among a plurality of business entities for the identity verification of the user, a number of electronic certificates that certify the user information and are used by each of the business entities to complete the identity verification, and a procedure time taken by each of the business entities for the identity verification; and generate, based on the first list, the second list, the number of electronic certificates for each of the business entities, and the procedure time, a workflow that minimizes a procedure time taken for completion of the identity verification by the target business entities and that describes a distribution procedure of the electronic certificates that are used in the identity verification at each of the business entities, wherein the cooperation includes an electronic-certificate-based identity verification in which the identity verification of the user is completed in response to verification of one or more electronic certificates transmitted from one or more other business entities, among those on the second list, as described in the generated workflow, and wherein the generated workflow describes, as the distribution procedure, which business entity, among those on the second list, performs a user-based identity verification in which the user involves and which business entity, among those on the second list, performs the electronic-certificate-based identity verification, and from which business entity to which business entity, among those on the second list, the electronic certificate is to be issued.

8. A method for identity verification to be performed by a computer configured to generate a workflow used by a control apparatus that controls a system in which a plurality of business entities manages, in a distributed manner, attribute information in user information that identifies a user, the method comprising:
receiving, as inputs, a first list of target business entities that perform identity verification of the user, a second list of business entities indicating whether cooperation is performed among a plurality of business entities for the identity verification of the user, a number of electronic certificates that certify the user information and are used by each of the business entities to complete the identity verification, and a procedure time taken by each of the business entities for the identity verification; and generating, based on the first list, the second list, the number of electronic certificates for each of the business entities, and the procedure time, a workflow that minimizes a procedure time taken for completion of the identity verification by the target business entities and that describes a distribution procedure of the electronic certificates that are used in the identity verification at each of the business entities, wherein the cooperation includes an electronic-certificate-based identity verification in which the identity verification of the user is completed in response to verification of one or more electronic certificates transmitted from one or more other business entities, among those on the second list, as described in the generated workflow, and wherein the generated workflow describes, as the distribution procedure, which business entity, among those on the second list, performs a user-based identity verification in which the user involves and which business entity, among those on the second list, performs the electronic-certificate-based identity verification, and from which business entity to which business entity, among those on the second list, the electronic certificate is to be issued.

\* \* \* \* \*